(12) United States Patent
Yasuda et al.

(10) Patent No.: US 7,731,117 B2
(45) Date of Patent: Jun. 8, 2010

(54) WEBBING WINDING DEVICE

(75) Inventors: Masaki Yasuda, Aichi-ken (JP); Kazuhiko Aihara, Aichi-ken (JP); Takashi Ono, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 805 days.

(21) Appl. No.: 11/507,024

(22) Filed: Aug. 21, 2006

(65) Prior Publication Data

US 2007/0001047 A1    Jan. 4, 2007

(30) Foreign Application Priority Data

May 29, 2005  (JP)  ............................ 2006-148686
Aug. 22, 2005  (JP)  ............................ 2005-240181

(51) Int. Cl.
  *B60R 22/28* (2006.01)
  *B60R 22/36* (2006.01)

(52) U.S. Cl. .................................. 242/379.1; 242/382

(58) Field of Classification Search .............. 242/379.1, 242/383.1, 383.2, 383.4, 384.1; 280/805, 280/806, 807; 297/471, 472, 476–478
See application file for complete search history.

(56) References Cited

U.S. PATENT DOCUMENTS

| | | | | |
|---|---|---|---|---|
| 5,628,469 A | * | 5/1997 | Fohl | ............................ 242/374 |
| 5,785,269 A | * | 7/1998 | Miller et al. | ............... 242/379.1 |
| 5,799,893 A | | 9/1998 | Miller, III et al. | |
| 5,842,658 A | * | 12/1998 | Sayles et al. | .............. 242/379.1 |
| 6,416,008 B1 | | 7/2002 | Fujii et al. | |
| 6,598,904 B2 | * | 7/2003 | Nagata et al. | ................ 280/807 |
| 6,616,081 B1 | | 9/2003 | Clute et al. | |
| 2002/0145068 A1 | | 10/2002 | Specht et al. | |
| 2003/0201357 A1 | | 10/2003 | Koning et al. | |
| 2004/0056136 A1 | * | 3/2004 | Blum et al. | ............... 242/379.1 |
| 2005/0139711 A1 | * | 6/2005 | Bell et al. | ................. 242/379.1 |

FOREIGN PATENT DOCUMENTS

| | | |
|---|---|---|
| DE | 103 07 430 B3 | 7/2004 |
| EP | 1405777 A1 | 4/2004 |

OTHER PUBLICATIONS

Bogdan Busuiocescu, European Search Report dated Nov. 29, 2006.

\* cited by examiner

*Primary Examiner*—John Q Nguyen
*Assistant Examiner*—Scott Haugland
(74) *Attorney, Agent, or Firm*—Roberts Mlotkowski Safran & Cole, P.C.; Thomas W. Cole

(57) ABSTRACT

A webbing winding device includes a spool, a pair of leg plates, a torsion shaft, a first locking mechanism, a second locking mechanism, and a control mechanism. A webbing belt is wound onto the spool. The two leg plates oppose one another in an axial direction of the spool. The torsion shaft is provided passing through the spool and deforms when a torque is applied to the spool. The first locking mechanism, at the side of one of the leg plates, restricts rotation of the spool in an unwinding direction. The second locking mechanism, at the side of the other of the leg plates, switches from a lock-release state to a locking state, and restricts rotation of the torsion shaft in the unwinding direction. The control mechanism is provided passing through the spool and causes the second locking mechanism to switch into the locking state.

10 Claims, 17 Drawing Sheets

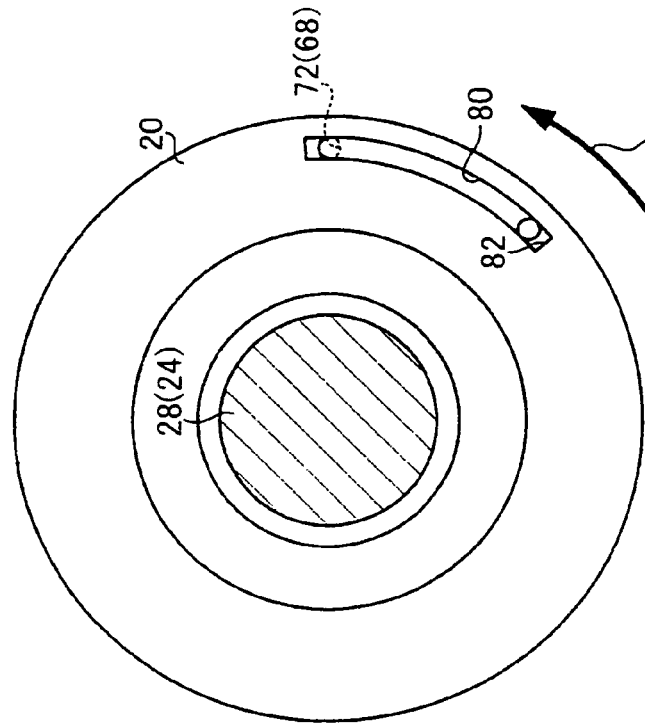
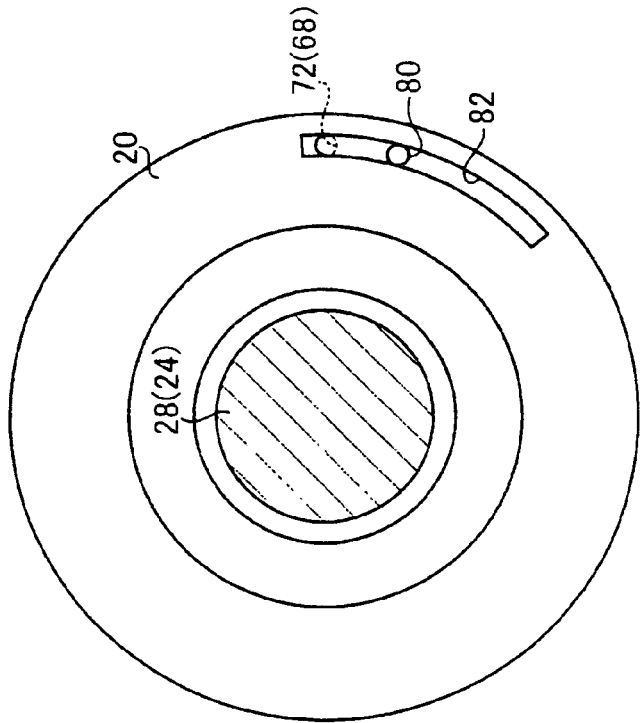

WEBBING WINDING DEVICE

CROSS-REFERENCE TO RELATED APPLICATION

This application claims priority under 35 USC 119 from Japanese Patent Applications No. 2005-240181 and No. 2006-148686, the disclosures of which are incorporated by reference herein.

BACKGROUND OF THE INVENTION

1. Field of the Invention

The present invention relates to a webbing winding device which winds up and accommodates a webbing belt which is for restraining the body of a vehicle occupant.

2. Description of the Related Art

A seatbelt apparatus, which restrains the body of an occupant seated on a seat of a vehicle with a long belt-form webbing belt, is equipped with a webbing winding device which is fixed to the vehicle body sideward of the seat. The webbing winding device is provided with, for example, a spool whose axial direction is arranged substantially along a front-rear direction of the vehicle. A length direction base end side of the webbing belt is anchored at this spool. The spool accommodates the webbing belt in a state in which the webbing belt is wound up in a layered form at an outer peripheral portion of the spool.

This kind of webbing winding device is also usually provided with a locking mechanism. Such locking mechanisms have various structures but, in functional terms, the locking mechanism locks the spool at a time of sharp deceleration of the vehicle, and restricts rotation of the spool when the webbing belt is being unwound. In a state of sharp deceleration of a vehicle, an occupant of the vehicle tends to move toward a forward side of the vehicle because of inertia. At this time, the webbing belt which is applied to the body of the occupant is pulled on by the body of the occupant.

Now, as mentioned above, when the spool is locked by the locking mechanism, unwinding of the webbing belt from the spool is restricted. Consequently, the movement of the body of the occupant toward the forward side of the vehicle due to inertia in the state of sharp deceleration of the vehicle can be effectively restricted by the webbing belt.

Further, there is a structure which is provided with a torsion shaft for energy absorption at an inner side of the spool. This torsion shaft is provided coaxially at the inner side of the spool to be rotatable with respect to the spool. One end portion of the torsion shaft is integrally joined to the spool.

Another end portion of the torsion shaft is joined to the aforementioned locking mechanism. When the locking mechanism operates, the other end portion of the torsion shaft is locked by the locking mechanism. When a rotation force acts on the spool, the torque is, naturally, also applied to the one end of the torsion shaft. However, in a state in which the locking mechanism has operated, because rotation of the other end of the torsion shaft is restricted, rotation of the torsion shaft as a whole is limited as a result, and rotation of the spool is indirectly restricted.

However, in the state in which rotation of the other end of such a torsion shaft is restricted by the locking mechanism, if a rotation force exceeding a mechanical strength of the torsion shaft acts on a portion of joining between the spool and the torsion shaft, a twisting deformation occurs in the torsion shaft, and rotation of the spool by an amount corresponding to this twisting deformation is enabled.

Therefore, at a time when the body of an occupant pulls on the webbing belt with an excessive force, the webbing belt is unwound by a certain amount, and a restraining force that the webbing belt applies to the body of the occupant is temporarily slightly reduced. At the same time, energy absorption is realized by the above-mentioned twisting deformation.

In a webbing winding device which is disclosed in U.S. Pat. No. 5,799,893, a torsion shaft is joined to a spool at an axial direction central portion of the spool, and locking mechanisms are provided at both ends of the spool for respectively restricting rotation of the torsion shaft.

In the webbing winding device disclosed in U.S. Pat. No. 5,799,893, one or both of the two locking mechanisms is operated, depending on the physical build of an occupant or the like. For the case in which both the locking mechanisms are operated, a rotation force required for causing twisting deformation of the torsion shaft must exceed a mechanical strength of the whole of the torsion shaft.

On the other hand, when only one of the locking mechanisms is operated, twisting deformation occurs in the torsion shaft if the mechanical strength of the torsion shaft at the side of the one locking mechanism, relative to the portion of joining of the torsion shaft with the spool, is exceeded.

In other words, in the webbing winding device disclosed in U.S. Patent No. 5,799,893, it is possible to switch the magnitude of a rotation force that is required for causing twisting deformation of the torsion shaft.

Now, in the webbing winding device disclosed in U.S. Pat. No. 5,799,893, in order to operate both of the locking mechanisms, it is necessary to cause both the one locking mechanism and the other locking mechanism to operate. Obviously, it is possible to independently constitute the two locking mechanisms each with the same structure. However, with such a constitution, a number of components is large and the webbing winding device as a whole becomes larger.

Therefore, a structure which joins to the one locking mechanism and operates the other locking mechanism is desirable. However, in order to join any member of the other locking mechanism to any member of the one locking mechanism, an interlinking member which crosses between the two locking mechanisms is required.

However, because the rotating spool is disposed between the two locking mechanisms, the interlinking member is provided so as to go round the outer side of the spool. An interlinking member which goes round the outer side of the spool in such a manner cannot be formed in a structure which rotates together with the spool. Accordingly, in a case in which a member at the one locking mechanism for moving the interlinking member is a pawl which restricts rotation of the spool by meshing with a ratchet tooth, it is not possible to form a structure in which the pawl is turned together with the spool.

Therefore, the ratchet tooth that the pawl meshes with must be formed in a structure which is provided integrally with the torsion shaft, and it is extremely difficult to apply the interlinking to a structure in which a pawl rotates together with the spool and restricts rotation of the spool by meshing with a ratchet tooth formed in a frame.

SUMMARY OF THE INVENTION

In consideration of the circumstances described above, an object of the present invention is to provide a webbing winding device in which locking mechanisms provided at each of two ends of a spool can be interlinked, whether in a structure in which a pawl rotates together with the spool or a structure in which the pawl does not rotate together with the spool.

A webbing winding device relating to a first aspect of the present invention includes: a spool at which a length direction base end of a long belt-form webbing belt is anchored, the webbing belt being wound, from the base end, onto the spool by rotation of the spool in a winding direction; a frame including a pair of leg plates which oppose one another in an axial direction of the spool; a first energy-absorbing member which is provided passing through the spool along the axial direction of the spool, the first energy-absorbing member deforming when a rotation force of at least a certain magnitude is applied to a portion of joining with the spool of the first energy-absorbing member; a first locking mechanism which includes a rotor that is integrally joined to the first energy-absorbing member at one of the pair of leg plates and which, in a predetermined condition, restricts rotation of the rotor in an unwinding direction, which is opposite to the winding direction, and indirectly restricts rotation of the spool in the unwinding direction; a second locking mechanism which is disposed at the other of the pair of leg plates and which switches from a lock-release state to a locking state for restricting rotation of the first energy-absorbing portion in the unwinding direction at the other of the pair of leg plates; and a control mechanism which is provided passing through the spool along the axial direction of the spool, the control mechanism causing the second locking mechanism to switch into the locking state in accordance with relative rotation between the rotor and the spool.

According to a webbing winding device relating to the above-described aspect of the present invention, in a state in which the webbing belt has been unwound from the spool and applied to a body of an occupant, when the predetermined condition is satisfied, such as, for example, when the vehicle enters a state of sharp deceleration or the like, the first locking mechanism provided at the one of the pair of leg plates which structure the frame operates. When the first locking mechanism operates, rotation of the rotor is restricted. Because the rotor is linked to the spool via the first energy-absorbing member, rotation of the spool in the unwinding direction is restricted by the restriction of rotation of the rotor in the unwinding direction.

Then, from this state, if the webbing belt is pulled on by a force at or above the certain magnitude due to, for example, inertia of the occupant to whom the webbing belt is applied during the sharp deceleration of the vehicle, a rotation force at or above the certain magnitude is applied to the spool. This torque is transmitted to the joining portion between the spool and the first energy-absorbing member, and acts to turn the first energy-absorbing member in the unwinding direction.

However, in this state, rotation of the rotor, and hence of the first energy-absorbing member, is restricted by the first locking mechanism. Therefore, when the rotation force in the unwinding direction at or above the certain magnitude is transmitted to the joining portion between the spool and the first energy-absorbing member as described above, a deformation occurs in the first energy-absorbing member, and the spool rotates a certain amount in the unwinding direction while rotation of the rotor is kept restricted.

Meanwhile, in the webbing winding device relating to the present invention, when relative rotation between the rotor of the first locking mechanism and the spool occurs, the second locking mechanism provided at the other of the pair of leg plates is switched to the locking state by the control mechanism. Hence, rotation in the unwinding direction of the first energy-absorbing member at the other of the pair of leg plates is restricted, and rotation of the spool in the unwinding direction is indirectly restricted.

Now, in the webbing winding device relating to the present invention, the control mechanism switches the second locking mechanism into the locking state in accordance with relative rotation between the rotor and the spool. Therefore, whether with a structure in which a locking member such as a pawl or the like is provided at the rotor and rotation of the rotor is restricted by the locking member engaging with one of the pair of leg plates, or with a structure in which a locking member such as a pawl or the like is provided at one of the pair of leg plates and rotation of the rotor is restricted by the locking member approaching the rotor and engaging with the rotor, the structure of the webbing winding device relating to the present invention can be employed.

In a webbing winding device relating to the above-described aspect of the present invention, it is possible that, in a state in which rotation of the first energy-absorbing member is restricted by the second locking mechanism, when a rotation force of at least a predetermined magnitude is applied to the spool, a deformation occurs in the first energy-absorbing member between the portion of joining of the spool with the first energy-absorbing member and a portion that is subject to the rotation restriction by the second locking mechanism.

In a webbing winding device of the structure described above, when the second locking mechanism is switched into the locking state by the control mechanism, rotation of the first energy-absorbing member in the unwinding direction at the other of the pair of leg plates is restricted, and thus rotation of the spool in the unwinding direction is indirectly restricted.

In this state, if a rotation force of the predetermined magnitude, for example, a magnitude significantly larger than the magnitude required for the first energy-absorbing member to deform when relative rotation between the rotor of the first locking mechanism and the spool occurs, acts on the spool, then relative rotation is generated both between the rotor of the first locking mechanism and the spool and between the second locking mechanism and the spool.

That is, in this state, deformations occur in the first energy-absorbing member at both sides of the first energy-absorbing member, via the joining portion between the spool and the first energy-absorbing member therebetween at an axial direction central portion of the spool.

Therefore, more energy is absorbed than in a case in which a deformation occurs in the first energy-absorbing member only at the side, relative to the joining portion between the spool and the first energy-absorbing member, of the rotor of the first locking mechanism.

A webbing winding device relating to the aspect of the present invention may include a lock-release mechanism which disables the rotation restriction of the first energy-absorbing member by the second locking mechanism.

In a webbing winding device relating to the above-described structure, when the lock-release mechanism has operated, even if the second locking mechanism operates, rotation restriction of the first energy-absorbing member by the second locking mechanism is disabled. Therefore, in this state, deformation occurs in the first energy-absorbing member only at the side, relative to the joining portion between the spool and the first energy-absorbing member, of the one of the pair of leg plates.

Thus, in the webbing winding device relating to the present invention, even with a structure in which the second locking member operates unconditionally when relative rotation between the rotor of the first locking member and the spool occurs, when the lock-release mechanism is operated, substantially the same effects as in a case in which the second locking mechanism is not operated are realized.

Accordingly, by operating the lock-release mechanism and not operating lock-operating means, it is possible to select an amount of deformation of the first energy-absorbing member, and it is resultantly possible to alter an energy absorption amount due to deformation of the first energy-absorbing member.

In a webbing winding device relating to the aspect of the present invention, the control mechanism may include a second energy-absorbing member, one end of which is anchored at the rotor and another end of which is accommodated at an inner side of the spool, the second energy-absorbing member being deformed while being drawn out toward the rotor when the spool relatively rotates in the unwinding direction with respect to the rotor, and switching of the second locking mechanism into the locking state being enabled by the second energy-absorbing member moving toward the rotor.

In a webbing winding device relating to the structure described above, when the spool relatively rotates in the unwinding direction with respect to the rotor of the first locking mechanism, the second energy-absorbing member accommodated at the inner side of the spool is drawn out (moves) from inside the spool. When the second energy-absorbing member moves thus, switching of the second locking member into the locking state is enabled.

Here, because the second energy-absorbing member is deformed while being drawn out, absorption of energy in a similar manner to deformation of the first energy-absorbing member is effected by this deformation of the second energy-absorbing member.

In the present invention, a control member of the control mechanism which substantially controls the second locking mechanism may be the same member as the second energy-absorbing member, and structures are also possible in which the control member and the second energy-absorbing member are separate members.

In a webbing winding device relating to the above-described aspect of the present invention, the other end of the second energy-absorbing member may protrude from the spool, engage with the second locking mechanism and maintain the second locking mechanism in the lock-release state, the engagement of the other end with the second locking mechanism being released by the other end being drawn into the spool, for enabling switching of the second locking mechanism into the locking state.

In a webbing winding device relating to the structure described above, the other end portion of the second energy-absorbing member accommodated at the inner side of the spool protrudes from the spool and engages with the second locking mechanism. Thus, the second locking mechanism is held in the lock-release state. When the spool rotates in the unwinding direction relative to the rotor and the second energy-absorbing member is drawn out from the spool, the other end portion of the second energy-absorbing member which is protruded from the spool is drawn into the spool. When the other end portion of the second energy-absorbing member is drawn into the spool thus, the engagement between the other end portion of the second energy-absorbing member and the second locking mechanism is released. Accordingly, when retention of the second locking mechanism by the second energy-absorbing member is released, switching of the second locking mechanism into the locking state is enabled.

Now, in a webbing winding device relating to the present invention, the structure that enables switching of the second locking member into the locking state (that is, the structure of the control mechanism) and the structure that serves as the second energy-absorbing member are the same member. Therefore, it is possible to suppress an increase in a number of components, and it is possible to keep costs down. Furthermore, when the one end of the second energy-absorbing member is drawn out from the spool, the other end of the second energy-absorbing member is reliably drawn into the spool. Therefore, the second locking mechanism can be reliably operated, in addition to which a responsiveness between commencement of relative rotation of the rotor with respect to the spool and operation of the second locking mechanism is good.

A webbing winding device relating to the aspect of the present invention may include: a first switching member which, by moving in a direction of withdrawal from an initial position, alters a state of at least one of the first locking mechanism and the second locking mechanism; and a restriction structure which restricts a return to the initial position of the first switching member that has withdrawn from the initial position.

According to a webbing winding device relating to the structure described above, when the first switching member moves so as to withdraw from the initial position thereof, the state of at least one of the first locking mechanism and the second locking mechanism changes.

However, if the first switching member which has withdrawn from the initial position moves back, due to a reaction when the first switching member collides with another component or the like, and acts to return to the initial position, movement toward the initial position is restricted by the restriction structure. Therefore, the above-mentioned locking mechanism whose status has changed can be prevented from inadvertently returning to the initial state thereof because of the first switching member that has withdrawn from the initial position inadvertently returning to the initial position.

In a webbing winding device relating to the above-described aspect of the present invention, the restriction structure may be structured to include a restriction member which opposes the first switching member that has withdrawn from the initial position at the initial position, abuts against the first switching member if the first switching member acts to move toward the initial position, and blocks a return of the first switching member to the initial position.

In a webbing winding device relating to the structure described above, when the first switching member withdraws from the initial position, the restriction member structuring the restriction structure opposes the first switching member from the initial position. Hence, if the first switching member acts to return to the initial position, the restriction member abuts against the first switching member, and the movement of the first switching member toward the initial position is restricted. Thus, the first switching member is prevented from returning to the initial position.

In a webbing winding device relating to the above-described aspect of the present invention, the restriction structure may include: a support member which supports the first switching member at the initial position from below; and a guide structure which guides the first switching member, which is moved by gravity when support by the support mechanism is removed, in a direction which is inclined relative to a vertical downward direction, and guides the first switching member to a position opposing the support member (away from the initial position) if the first switching member moves toward the initial position after withdrawing from the initial position.

In a webbing winding device relating to the structure described above, the first switching member at the initial position is supported from below by the support member. When the support by the support member is released, the first switching member descends due to gravity, and is guided in the direction which is inclined with respect to the vertical downward direction by the guide structure. Thus, in the webbing winding device relating to the present invention, a particular driving force for withdrawing the first switching member from the initial position is not required.

Conversely, if the first switching member which has withdrawn from the initial position acts to return to the initial position, the first switching member is guided by the guide structure. Because the first switching member is guided by the guide structure, the first switching member opposes the support member. As a result, the first switching member which is acting to return to the initial position abuts against the support member. Consequently, the first switching member cannot return to the initial position.

In a webbing winding device relating to the above-described aspect of the present invention, the restriction structure may include an urging member of the switching member, which urges the first switching member in the direction of withdrawal from the initial position.

In a webbing winding device relating to the structure described above, the first switching member is urged in a direction of withdrawal from the initial position by the urging member of the switching member. Therefore, if the first switching member that has withdrawn from the initial position acts to return to the initial position, the first switching member acting to return to the initial position is opposed by the urging force of the urging member. Thus, the first switching member is prevented from returning to the initial position.

A webbing winding device relating to the aspect of the present invention may further include: a second switching member which, by moving in a direction of withdrawal from an initial position, alters a state of at least one of the first locking mechanism and the second locking mechanism; a blocking member which is provided standing at a side of the second switching member that is at the initial position, abuts against the second switching member, and blocks movement of the second switching member in the direction of withdrawal from the initial position; and a clearance cavity which is provided sideward of a path of movement of the second switching member in the direction of withdrawal from the initial position, accommodates the blocking member when the blocking member is detached from a standing direction base end side thereof and falls, and allows the blocking member to be cleared from the movement path.

In a webbing winding device relating to the structure described above, the blocking member abuts against the second switching member which is at the initial position from the side of the second switching member, and thus movement of the second switching member in the direction of withdrawal from the initial position is blocked. When the blocking member is detached from the standing direction base end side thereof and falls, the blocking member is accommodated in the clearance cavity which is provided at the side of the second switching member. Thus, the blocking member is removed from the movement path when the second switching member is to move in the direction of withdrawal from the initial position. Therefore, because the blocking member has been cleared from the movement path of the second switching member, as well as the previous movement-blocked state of the second switching member being released, the detached blocking member will not inadvertently impede movement of the second switching member, and the second switching member can withdraw from the initial position smoothly. Therefore, the state of the at least one of the first locking mechanism and the second locking mechanism can be altered reliably.

Now, while the present invention has a structure which is provided with the blocking member as described above, a detachment timing of the blocking member is not particularly limited. Accordingly, a structure is possible in which the second switching member or another member detaches the blocking member when the second switching member is to move in order to alter the state of one or both of the first locking mechanism and the second locking mechanism. A structure is also possible in which a blocking member is provided for temporary retention of the second switching member, for example, when the webbing winding device relating to the present invention is being assembled, and the blocking member is detached in a state in which the temporary retention of the second switching member is no longer required.

In a webbing winding device relating to the above-described aspect of the present invention, an outer diametric dimension of the blocking member may be set smaller than a size of the clearance cavity along the standing direction of the blocking member.

In a webbing winding device relating to the structure described above, the diametric dimension of the blocking member is smaller than the size of the clearance cavity along the standing direction of the blocking member. Therefore, the blocking member which has been detached from the standing direction base end side thereof can be accommodated in the clearance cavity by falling, and can be reliably cleared from the movement path of the second switching member.

As has been described hereabove, in a webbing winding device relating to the present invention, as long as there is a structure in which a rotor of a first locking mechanism relatively rotates with respect to a spool, a second locking mechanism can be provided with substantially the same structure, basically regardless of specific structure of the first locking mechanism.

BRIEF DESCRIPTION OF THE DRAWINGS

FIG. 7A is a front view showing a positional relationship of a spool and a second energy-absorbing member, which shows a state prior to movement of the second energy-absorbing member.

FIG. 7B is a front view showing a positional relationship of the spool and the second energy-absorbing member, which shows a state in which the second energy-absorbing member has moved.

DETAILED DESCRIPTION OF THE INVENTION

Structure of First Embodiment

Now, a first embodiment of the present invention will be described using FIGS. 1 to 9.

Herein, characteristic actions and effects of the first embodiment will be described by comparing a basic structure and a variant structure of the first embodiment. Accordingly, respective constitutions of the basic structure and the variant structure will be described first.

Constitution of Basic Structure

Figure 5:
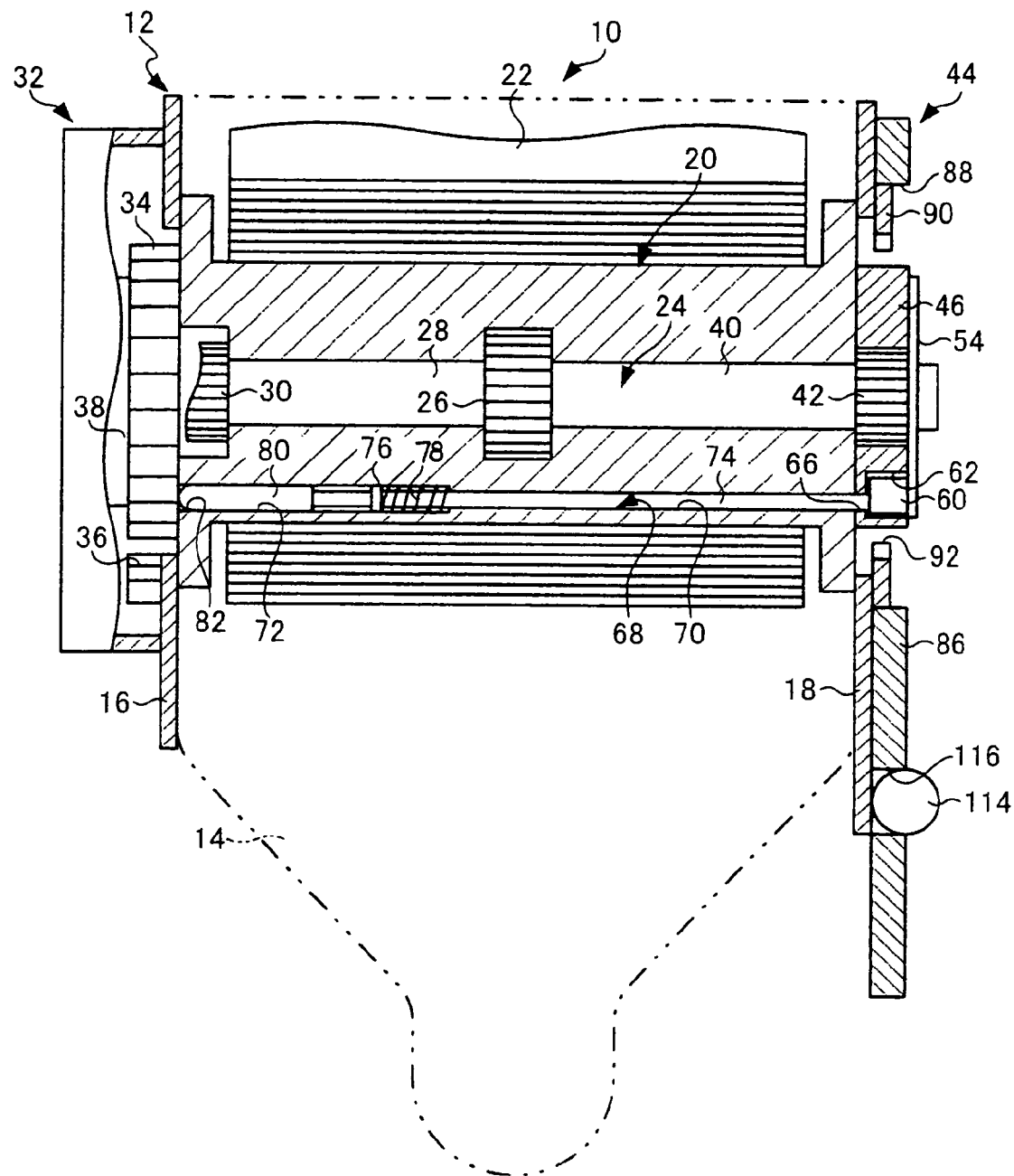
FIG. 5 is a front sectional view showing general structure of the webbing winding device in relation to a basic structure of the first embodiment of the present invention.

FIG. 5 shows general structure of a webbing winding device 10 relating to the basic structure of the first embodiment in a sectional view.

As shown in FIG. 5, the webbing winding device 10 is provided with a frame 12, and the frame 12 is provided with a plate-form rear plate 14, which is fixed to a vehicle body. A leg plate 16 extends substantially perpendicularly with respect to the rear plate 14 from an end portion at one width direction end of the rear plate 14. In addition, a leg plate 18 extends from an end portion at the other width direction end of the rear plate 14, in a direction the same as the direction of extension of the leg plate 16. Thus, the frame 12 has a substantial 'U' shape in plan view.

A spool 20 is disposed between the leg plate 16 and the leg plate 18. An axial direction of the spool 20 is set along the direction of opposition of the leg plate 16 and leg plate 18. A base end portion of a long belt-form webbing belt 22 is anchored to an axial direction central portion of the spool 20. By turning in a winding direction, which is one way around the axis thereof, the spool 20 winds up the webbing belt 22 from the base end side thereof and accommodates the webbing belt 22.

The spool 20 is formed with a cavity along the central axis thereof. At an inner side thereof, a torsion shaft 24 is accommodated, which serves as a first energy-absorbing member. The torsion shaft 24 is provided with a spool-side joining portion 26. The spool-side joining portion 26 is disposed between the two axial direction ends of the spool 20, and the torsion shaft 24 is integrally joined with the spool 20 by this spool-side joining portion 26.

A rod-form first deformation portion 28 is continuingly formed from an end face at the leg plate 16 side of the spool-side joining portion 26. At a distal end side of the first deformation portion 28, a first connecting portion 30 is formed coaxially and integrally with the first deformation portion 28. The first connecting portion 30 is coaxially and integrally joined with a first lock base 34, which serves as a rotor, structuring a first locking mechanism 32, which serves as a first locking mechanism of the basic structure.

The first lock base 34 is coaxially and relatively rotatably fitted onto the spool 20 from an end portion of the spool 20 at the leg plate 16 side thereof. Here, because the first connecting portion 30 is integrally joined with the first lock base 34 as described above, the first lock base 34 is coaxially and integrally joined to the spool 20.

A first locking pawl 36 is provided at a radial direction outer side of the first lock base 34. The first locking pawl 36 is axially supported at the leg plate 16 to be capable of turning. When the first locking pawl 36 turns in a predetermined direction, a ratchet tooth formed at the first locking pawl 36 approaches an outer peripheral portion of the first lock base 34, and meshing of this ratchet tooth with ratchet teeth formed at the outer peripheral portion of the first lock base 34 is enabled.

Meanwhile, at an opposite side of the first lock base 34 from the side thereof at which the spool 20 is disposed, a rotating member 38 is provided coaxially and relatively rotatably with respect to the first lock base 34. The rotating member 38 is a structure which is turned to follow the first lock base 34 by urging force of an unillustrated urging member, such as a compression coil spring, a torsion coil spring or the like.

Further, although not illustrated in detail, the first locking mechanism 32 is provided with one or a plurality of restriction structures which restrict(s) rotation of the rotating member 38. At a time of inertia during a sharp deceleration of the vehicle or the like, when the first lock base 34 is rapidly rotated in an unwinding direction, which is opposite to the aforementioned winding direction, this restriction structure operates and the rotation of the rotating member 38 is restricted. In the state in which this rotation restriction of the rotating member 38 is implemented, in conjunction with a relative rotation between the first lock base 34 and the rotating member 38 which occurs when the first lock base 34 acts to rotate in the unwinding direction, the first locking pawl 36 moves toward the outer peripheral portion of the first lock base 34.

Meanwhile, a rod-form second deformation portion 40 is continuingly formed from an end face at the leg plate 18 side of the spool-side joining portion 26. At a distal end side of the second deformation portion 40, a second connecting portion 42 is formed coaxially and integrally with the second deformation portion 40. The second connecting portion 42 is coaxially and integrally joined with a second lock base 46, which structures a second locking mechanism 44 which serves as a second locking mechanism.

The second lock base 46 is coaxially and relatively rotatably fitted onto the spool 20 from an end portion of the spool 20 at the leg plate 18 side thereof. Here, because the second connecting portion 42 is integrally joined with the second lock base 46 as mentioned above, the second lock base 46 is coaxially and integrally joined to the spool 20.

Figure 1:
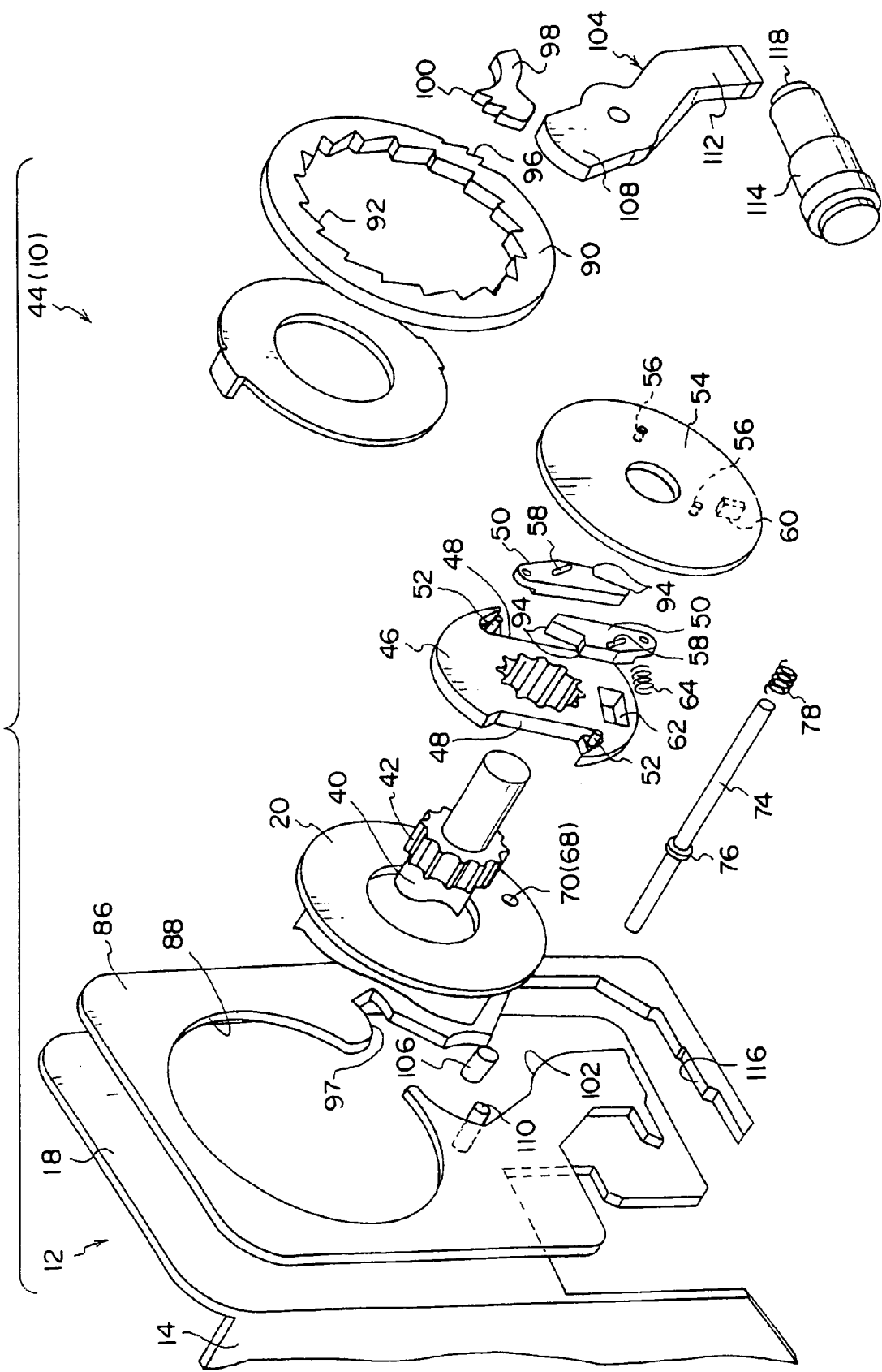
FIG. 1 is an exploded perspective view showing structure of a second locking mechanism of a webbing winding device relating to a first embodiment of the present invention.
Figure 2:
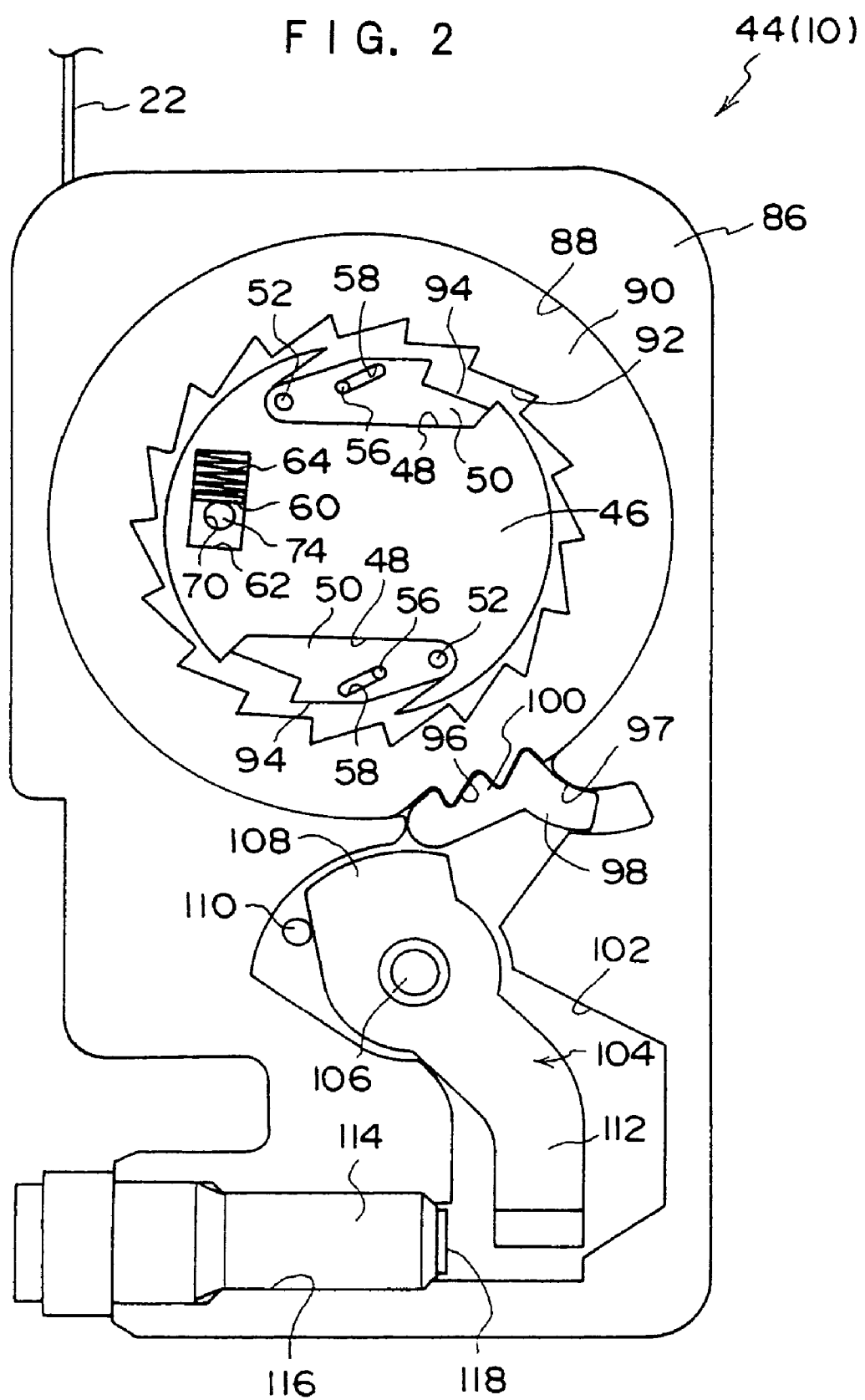
FIG. 2 is a front view showing general structure of the second locking mechanism.
Figure 3:
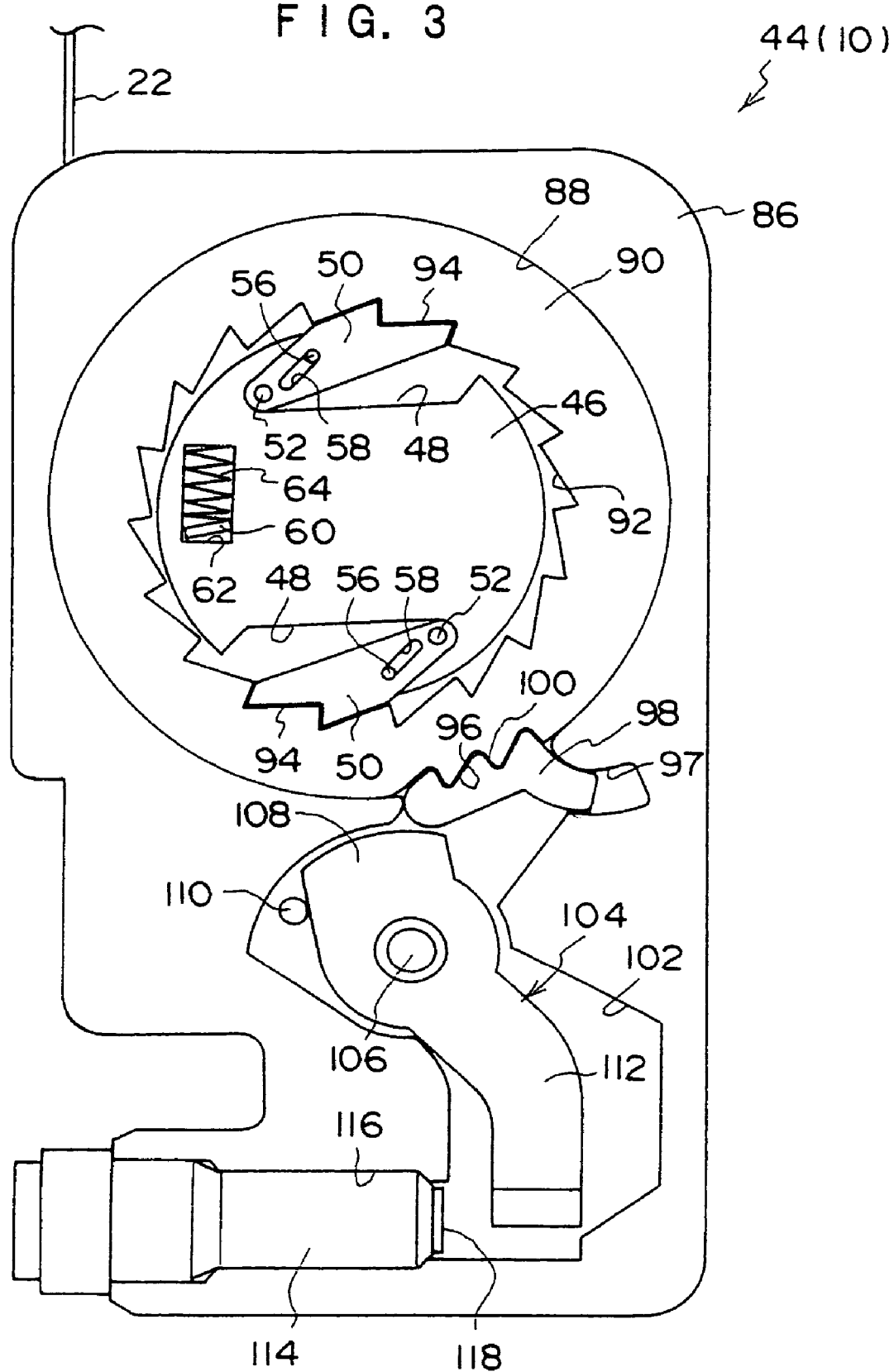
FIG. 3 is a front view, corresponding to FIG. 2, showing an operational state of the second locking mechanism.
Figure 4:
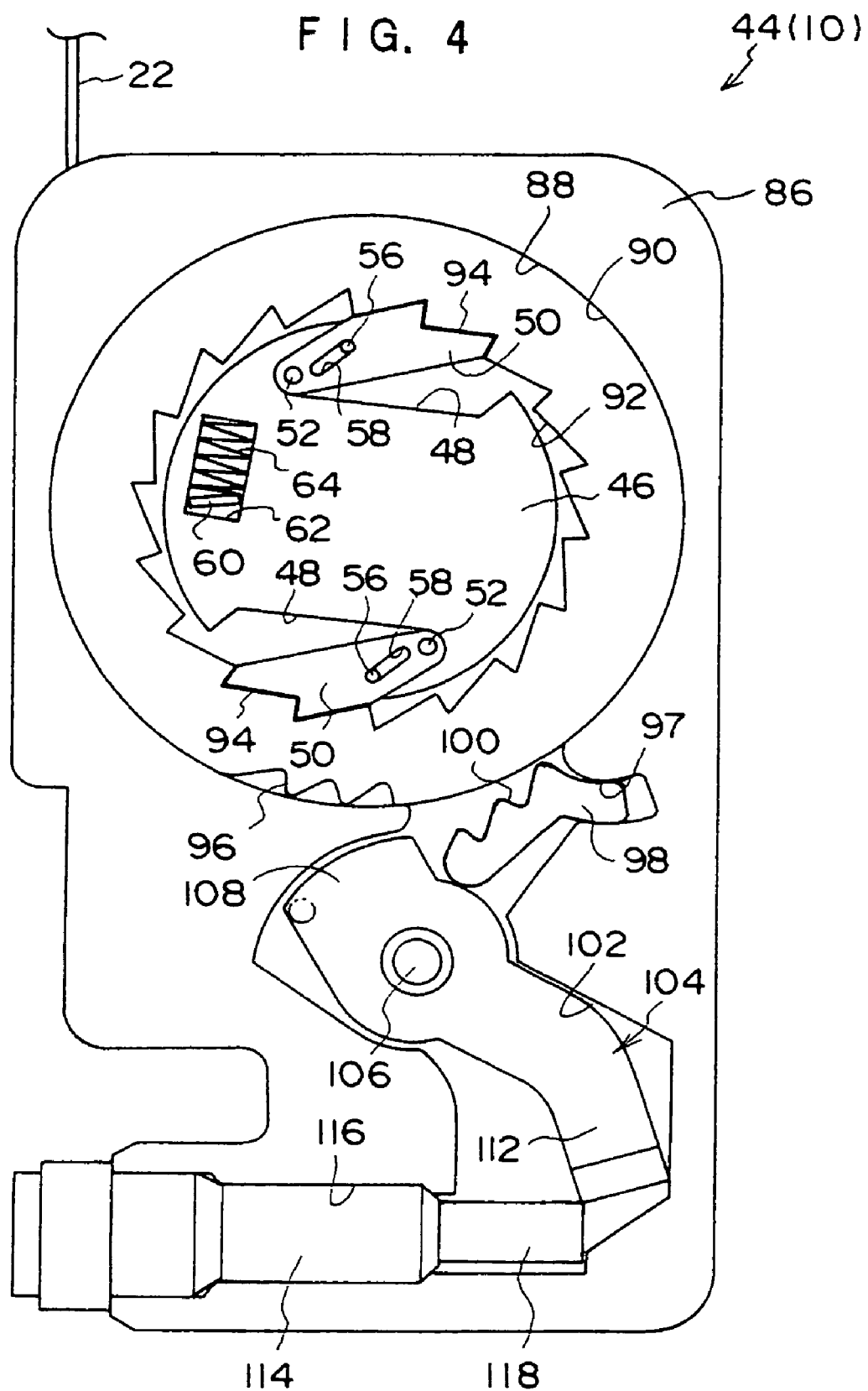
FIG. 4 is a front view, corresponding to FIG. 2, showing an operational state of a lock-release mechanism.

As shown in FIGS. 1 and 2, a pair of pawl accommodation portions 48 are formed in the second lock base 46. The pawl accommodation portions 48 open out at portions of an outer periphery of the second lock base 46, and open out at an end face of the second lock base 46 at a side thereof that is opposite from the side at which the spool 20 is disposed. Second locking pawls 50 are accommodated in the pawl accommodation portions 48. Each second locking pawl 50 is axially supported, to be turnable about an axis which is parallel with the spool 20, by a pawl support pin 52, which is formed in the pawl accommodation portion 48. Each second locking pawl 50 is generally accommodated in the pawl accommodation portion 48. However, when the second locking pawl 50 turns one way about the pawl support pin 52, a distal end side of the second locking pawl 50 protrudes outward from the opening portion of the pawl accommodation portion 48 that is at the outer peripheral portion.

Further, at an opposite side of the second lock base 46 from the side thereof at which the spool 20 is disposed, a rotating disc 54 is provided. The rotating disc 54 is basically axially supported at the spool 20 to be coaxially relatively rotatable with respect to the spool 20. A pair of guidance pins 56 are formed protruding from an end face of the rotating disc 54 at the second lock base 46 side thereof. These guidance pins 56 are provided to correspond with the above-mentioned second locking pawls 50.

A long hole 58 is formed in each of the second locking pawls 50 to correspond with the respective guidance pin 56, and the guidance pin 56 is inserted into the long hole 58. A width dimension of the long hole 58 is very slightly larger than a diametric dimension of the guidance pin 56. In this structure, when the guidance pins 56 turn one way about the spool 20 together with the rotating disc 54, the guidance pins 56 abut against inner walls of the long holes 58 and cause the second locking pawls 50 to turn about the pawl support pins 52.

A flat plate-form plate 60 is formed protruding from an end face of the rotating disc 54 at the second lock base 46 side thereof. A rectangle-form spring accommodation hole 62 is formed in the second lock base 46 to correspond with the plate 60. A rotating disc-urging spring 64 is accommodated inside the spring accommodation hole 62.

The rotating disc-urging spring 64 is a compression coil spring, one end of which pushes against an inner wall of the spring accommodation hole 62 and the other end of which pushes against the plate 60, which is inserted inside the spring accommodation hole 62. The rotating disc 54 can rotate the one way about the spool 20 when the plate 60 receives urging force from the rotating disc-urging spring 64. When the rotating disc 54 rotates in this direction, the guidance pins 56 cause the second locking pawls 50 to turn the one way about the pawl support pins 52.

Meanwhile, as shown in FIGS. 1 and 5, a through-hole 66 is formed from a floor portion of the spring accommodation hole 62. A stopper accommodation hole 68 is formed in the spool 20 to correspond with the through-hole 66. The stopper accommodation hole 68 is structured by a small diameter portion 70 and a large diameter portion 72, an interior diameter dimension of which is larger than that of the small diameter portion 70. The large diameter portion 72 is formed in a shape having a floor, which opens out at an end portion of the spool 20 at the first lock base 34 side thereof. Meanwhile, one end of the small diameter portion 70 opens out at an end portion of the spool 20 at the second lock base 46 side thereof, and the other end of the small diameter portion 70 opens out into the floor portion of the large diameter portion 72.

A stopper 74, which serves as a control mechanism, is accommodated inside this stopper accommodation hole 68. The stopper 74 is formed in a rod shape with length along the axial direction of the spool 20. One end of the stopper 74 passes through the small diameter portion 70 and is inserted into the large diameter portion 72. A disc-form flange 76 extends from an outer peripheral portion of the portion of the stopper 74 that is inserted into the large diameter portion 72. A stopper-urging spring 78, which serves as a stopper-urging member, is disposed between the flange 76 and the floor portion of the large diameter portion 72. The stopper-urging spring 78 is constituted by a compression coil spring, which urges the flange 76, and hence the stopper 74, toward the first lock base 34.

A wire 80, which serves as a second energy-absorbing member, is accommodated in the large diameter portion 72. One end of the wire 80 protrudes outside the spool 20 through the opening end of the large diameter portion 72. A wire guide channel 82 (see FIG. 7A) is formed in one or both of an end portion of the spool 20 at the first lock base 34 side thereof and an end portion of the first lock base 34 at the spool 20 side thereof (in the present embodiment, the end portion of the spool 20), to correspond with the portion of the wire 80 that protrudes from the spool 20. The wire guide channel 82 is curved with the central axis of the spool 20 as a center of the curvature. One end portion of the wire 80, relative to a middle portion of the wire 80, passes into the wire guide channel 82, and the one end portion of the wire 80 curves to follow the wire guide channel 82.

Figure 8:
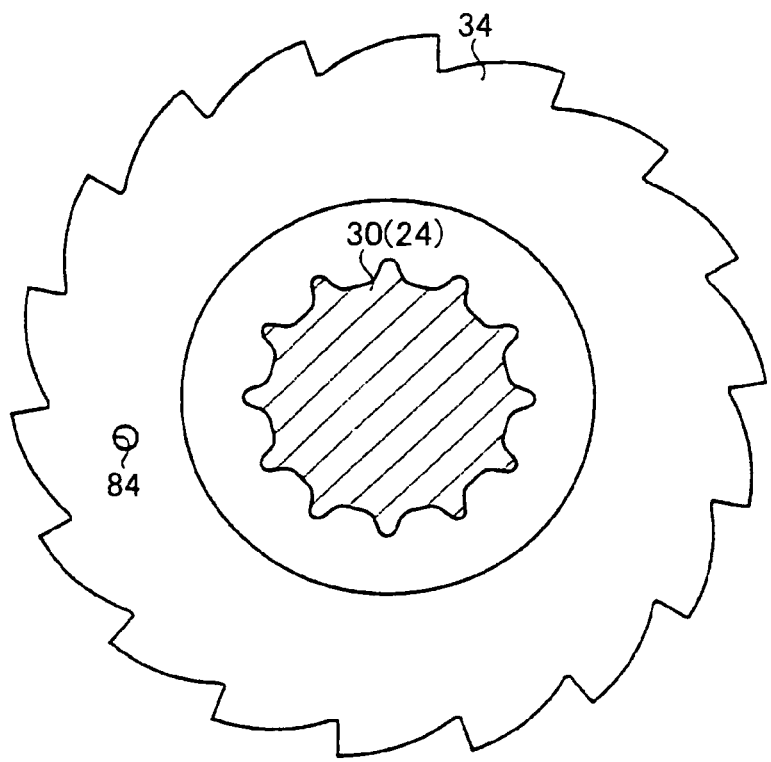
FIG. 8 is a front view of a rotor of a first locking mechanism in the basic structure.

The one end portion of the wire 80 is further inflected in the wire guide channel 82 to the first lock base 34 side thereof, and passes into a wire anchoring hole 84, which is formed in the first lock base 34 as shown in FIG. 8.

Meanwhile, another end portion of the wire 80 in the large diameter portion 72 abuts against an end portion of the aforementioned stopper 74 in a state of opposing the stopper 74, and restricts movement of the stopper 74 toward the first lock base 34 due to the urging force of the stopper-urging spring 78.

In the state in which movement of the stopper 74 is restricted by the wire 80, another end portion of the stopper 74 passes through the small diameter portion 70 and protrudes out of the spool 20. Further, as shown in FIGS. 1 and 2, the stopper 74 passes through the through-hole 66 formed in the floor portion of the spring accommodation hole 62 of the second lock base 46, and is inserted to inside the spring accommodation hole 62. The other end of the stopper 74 which is inserted into the spring accommodation hole 62 is disposed at a side of the plate 60 that is opposite from the side thereof at which the rotating disc-urging spring 64 is disposed. Thus, as shown in FIG. 2, the stopper 74 interferes with the plate 60, which acts to turn because of the urging force of the rotating disc-urging spring 64.

Now, as shown in FIGS. 1 and 2, a generator base 86 is integrally joined with the leg plate 18 at the outer side of the leg plate 18. A circular hole 88 is formed in the generator base 86 coaxially with the spool 20. An inner diameter dimension of the circular hole 88 is substantially larger than the second lock base 46, and the second lock base 46 passes through the circular hole 88. A locking ring 90 is axially supported at the circular hole 88 to be rotatable. The locking ring 90 is formed in a ring shape overall, and an internal ratchet 92 is formed at an inner periphery side of the locking ring 90. The internal ratchet 92 is formed to correspond with second locking pawl ratchets 94, which are formed at distal end portions of the second locking pawls 50. When the second locking pawls 50 turn the one way about the pawl support pins 52 and protrude to the outer sides of the pawl accommodation portions 48, the second locking pawl ratchets 94 mesh with the internal ratchet 92.

An external ratchet 96 is formed at a portion of the outer periphery of the locking ring 90. A ring-locking pawl accommodation hole 97, which communicates with the circular hole 88, is formed to correspond with the external ratchet 96. A ring-locking pawl 98, which serves as a first switching member and a second switching member, is disposed inside the ring-locking pawl accommodation hole 97. A ring-locking ratchet 100, which is meshable with the external ratchet 96, is formed at a distal end side of the ring-locking pawl 98.

In a state in which the ring-locking ratchet 100 is meshed with the external ratchet 96, if the locking ring 90 acts to turn one way about its own axis, the ring-locking pawl 98 acts to turn to follow the locking ring 90. However, when the ring-locking pawl 98 acts to turn the one way about the axis of the locking ring 90 along with the locking ring 90, an inner wall of the ring-locking pawl accommodation hole 97 interferes with the ring-locking pawl 98, and restricts turning of the ring-locking pawl 98, and hence rotation of the locking ring 90.

A support arm accommodation hole 102 is formed in the generator base 86 at the lower side of the ring-locking pawl 98. The support arm accommodation hole 102 communicates with the above-mentioned ring-locking pawl accommodation hole 97, an inner side of the support arm accommodation hole 102 constitutes a restriction structure which serves as a restriction member, and the support arm accommodation hole 102 accommodates a support arm 104, which constitutes a support member. The support arm 104 is axially supported, to be rotatable about an axis which is parallel with the spool 20, by an arm support pin 106, which is formed protruding from the leg plate 18.

One end side of the support arm 104 relative to a portion of support thereof by the arm support pin 106 serves as a support portion 108. In a state in which the support arm 104 is at a position of support about the arm support pin 106, a distal end portion of the support portion 108 abuts against the ring-locking pawl 98 in a state of opposing a side face of the ring-locking pawl 98. Thus, in the state in which the ring-locking ratchet 100 of the ring-locking pawl 98 is meshed with the external ratchet 96 of the locking ring 90, the distal end portion of the support portion 108 supports the ring-locking pawl 98.

Sideward of the support portion 108, a shear pin 110 is formed protruding from the leg plate 18. The shear pin 110 abuts against and interferes with the support portion 108, and thus restricts rotation of the support arm 104 one way about the arm support pin 106.

The other end side of the support arm 104 relative to the portion of support by the arm support pin 106 serves as a pushed portion 112. Sideward of the pushed portion 112, a gas generator 114 is provided to constitute a lock-release mechanism. The gas generator 114 is disposed inside a generator accommodation hole 116, which is formed in the generator base 86, and the gas generator 114 is fixed to the generator base 86 by unillustrated fastening means such as a bolt or the like.

Chemicals, such as an ignition agent and a gas generation agent or the like, and an ignition device, which ignites the ignition agent when an electrical ignition signal is inputted, are accommodated inside the gas generator 114. The ignition device of the gas generator 114 is connected to an unillustrated ECU (control device).

The ECU is directly or indirectly connected to, for example, each of danger-sensing means and build-sensing means. The danger-sensing means, such as an acceleration sensor which detects a sharp deceleration of the vehicle, a distance sensor which detects when a distance from the front of the vehicle to an obstacle falls below a certain value, or the like, directly or indirectly detects when the vehicle is sharply decelerating, is about to enter a sharp deceleration condition, or the like. The build-sensing means, such as a weight sensor which detects a weight that is applied to a seat of the vehicle, a belt sensor which detects when the webbing belt 22 is unwound from the spool 20 by more than a certain amount, or the like, directly or indirectly detects the physical build of an occupant sitting on the seat.

On the basis of signals from the danger-sensing means, the ECU judges when the vehicle has entered a sharp deceleration state or when the vehicle is about to enter a sharp deceleration state. Then, if the ECU judges that the build of the occupant sitting on the seat is less than a pre-specified standard value, an ignition signal is outputted from the ECU to the ignition device of the gas generator 114.

The gas generator 114 structures a type of gas cylinder, one axial direction end of which opposes a side face of the pushed portion 112 of the support arm 104. A push plunger 118 is provided at the gas generator 114. One axial direction end of the push plunger 118 protrudes from the gas generator 114, and opposes a side face of the pushed portion 112 of the support arm 104.

In this structure, the ignition agent is ignited when the ignition signal is inputted to the ignition device of the gas generator 114. The ignited ignition agent causes the gas generation agent to combust, and gas is momentarily generated within the gas generator 114. Pressure of this gas acts so as to push the push plunger 118 outside from the gas generator 114, and the push plunger 118 which has been pushed out from the gas generator 114 pushes against the pushed portion 112 of the support arm 104 and turns the support arm 104.

Constitution of Variant Structure

Next, the constitution of the variant structure of the present embodiment will be described. In descriptions of this variant structure, structures that are generally the same as in the basic embodiment are assigned the same reference numerals and detailed descriptions thereof will not be given.

Figure 6:
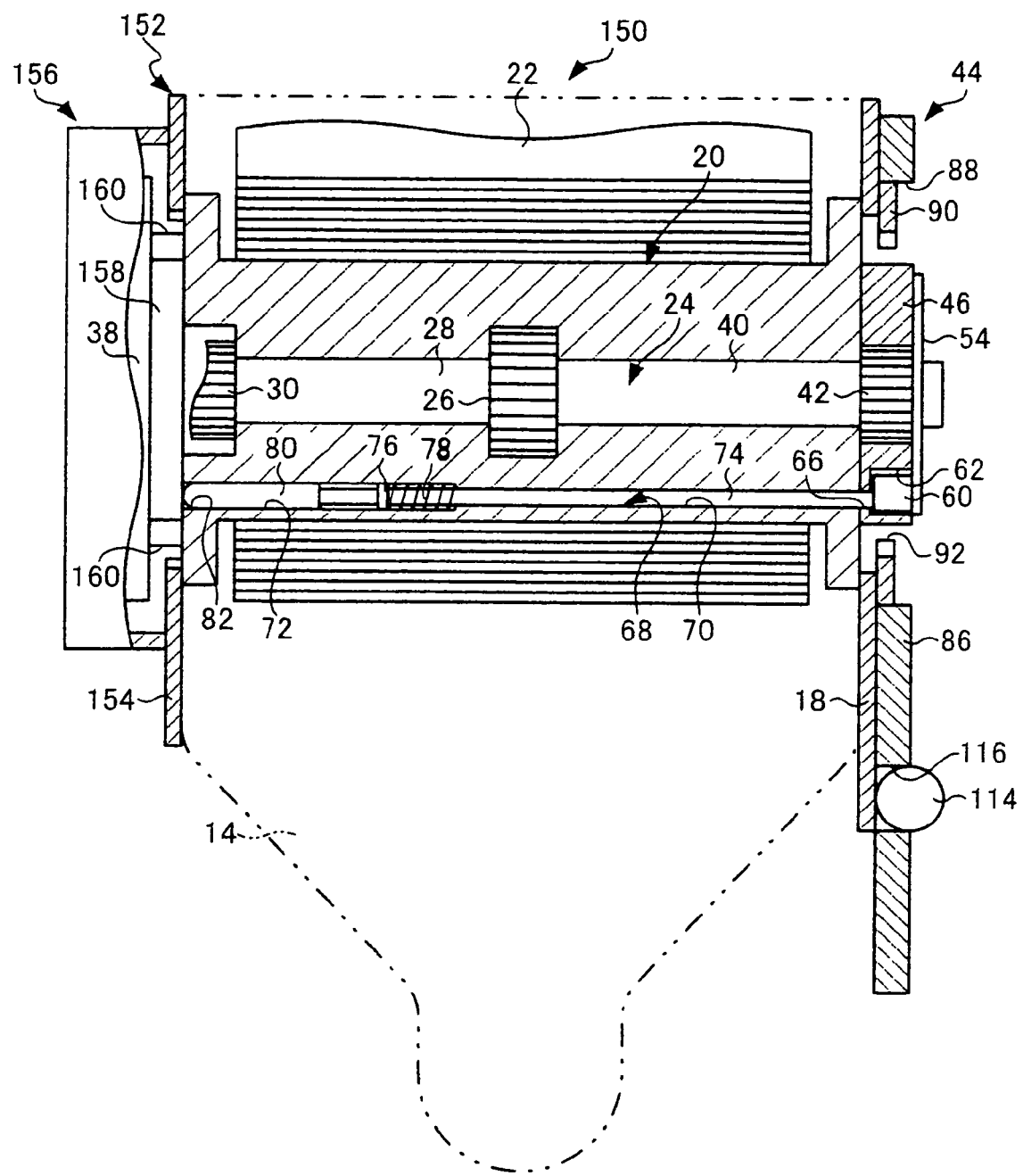
FIG. 6 is a front sectional view showing general structure of the webbing winding device in relation to a variant structure of the first embodiment of the present invention.

FIG. 6 shows general structure of a webbing winding device 150 relating to the variant structure in a sectional view.

As shown in FIG. 6, the webbing winding device 150 is provided with a frame 152 in place of the frame 12. The frame 152 is provided with a leg plate 154 in place of the leg plate 16. The leg plate 154 includes a ratchet hole, at an inner peripheral portion of which ratchet teeth are formed.

Further, rather than being provided with the first locking mechanism 32 to serve as the first locking mechanism, the webbing winding device 150 is instead provided with a first locking mechanism 156, which serves as the first locking mechanism for the variant structure.

Figure 9:
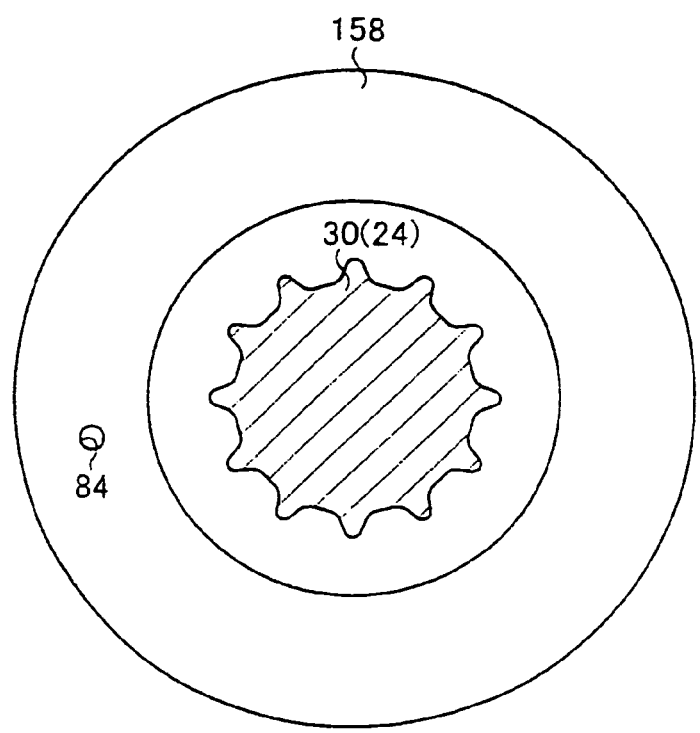
FIG. 9 is a front view of a rotor of the first locking mechanism in the variant structure.

The first locking mechanism 156 is provided with a first lock base 158, which serves as a rotor. The first lock base 158 is structured similarly to the first lock base 34 in being coaxially and relatively rotatably fitted onto the spool 20 from the leg plate 154 side of the spool 20, in that the first connecting portion 30 is coaxially and integrally joined with the first lock base 158, in that a wire is formed, and so forth. However, as is shown in FIG. 9, ratchet teeth are not formed at the outer periphery portion of the first lock base 158.

First locking pawls 160 are mounted at the first lock base 158. The first locking pawls 160 are a structure which engages with the rotating member 38. In a state in which a rotation restriction of the rotating member 38 is implemented, in conjunction with a relative rotation between the first lock base 158 and the rotating member 38 that occurs when the first lock base 158 acts to turn in the unwinding direction, the first locking pawls 160 move toward an inner peripheral portion of a ratchet hole, and ratchet teeth formed at distal ends of the first locking pawls 160 mesh with ratchet teeth of the ratchet hole.

Actions and Effects of the Present Embodiment

Next, before a description of actions and effects of the present embodiment, respective operations of the first locking mechanism 32 of the webbing winding device 10 and the first locking mechanism 156 of the webbing winding device 150 will be described.

Operation of the First Locking Mechanism 32

With the webbing winding device 10, in a state in which the webbing belt 22 has been drawn out from the spool 20 and applied to a body of an occupant of the vehicle, when, for example, the vehicle enters a sharp deceleration state, the first locking mechanism 32 operates and, firstly, rotation of the rotating member 38 in the unwinding direction is restricted.

Then, if the body of the occupant acts to move forward due to inertia during the sharp deceleration of the vehicle, and the webbing belt 22 is rapidly drawn out and the spool 20 acts to rotate in the unwinding direction, then the first lock base 34 which is integrally joined with the spool 20 via the torsion shaft 24 rotates in the unwinding direction.

In this state, when rotation of the rotating member 38 in the unwinding direction is restricted as described above, a relative rotation is generated between the first lock base 34 and the rotating member 38, and the first locking pawl 36 approaches the first lock base 34.

Accordingly, the ratchet teeth of the first locking pawl 36 mesh with the ratchet teeth of the first lock base 34, and rotation of the first lock base 34 in the unwinding direction, and hence rotation of the spool 20 in the unwinding direction, is restricted. Thus, unwinding of the webbing belt 22 from the spool 20 is restricted. Accordingly, the body of the occupant which is acting to move forward can be reliably restrained by the webbing belt 22.

Operation of the First Locking Mechanism 156

On the other hand, with the webbing winding device 150, when the vehicle enters the sharp deceleration state and the first locking mechanism 156 operates, firstly, rotation of the rotating member 38 in the unwinding direction is restricted.

Then, if the body of the occupant acts to move forward due to inertia during the sharp deceleration of the vehicle, and the webbing belt 22 is rapidly drawn out and the spool 20 acts to rotate in the unwinding direction, then the first lock base 158 which is integrally joined with the spool 20 via the torsion shaft 24 rotates in the unwinding direction.

In this state, when rotation of the rotating member 38 in the unwinding direction is restricted as described above, a relative rotation is generated between the first lock base 158 and the rotating member 38, and the first locking pawls 160 approach the interior peripheral portion of the ratchet hole.

Accordingly, the ratchet teeth of the first locking pawls 160 mesh with the ratchet teeth of the ratchet hole, and rotation of the first lock base 158 in the unwinding direction, and hence rotation of the spool 20 in the unwinding direction, is restricted. Thus, unwinding of the webbing belt 22 from the spool 20 is restricted. Accordingly, the body of the occupant which is acting to move toward the front of the vehicle can be reliably restrained by the webbing belt 22.

Operation of the Torsion Shaft 24

In the state in which rotation of the first lock base 34 or 158 is restricted by the first locking pawl(s) 36 or 160 as described above, if the body of the occupant pulls on the webbing belt 22 with an even greater force, and a rotation force of the spool 20 in the unwinding direction according to this pulling force exceeds a mechanical strength of the first deformation portion 28, then the first deformation portion 28 is twisted, in a state in which the first connecting portion 30 stays joined with the first lock base 34 or 158, and the spool 20 rotates in the unwinding direction by an amount corresponding to this twisting.

As a result, the webbing belt 22 unwinds from the spool 20 by an amount corresponding to the amount of rotation of the spool 20 in the unwinding direction. Consequently, a restraining force on the occupant from the webbing belt 22 is slightly weakened, and energy that is provided by the pulling of the webbing belt 22 is absorbed in an amount corresponding to the above-mentioned twisting deformation.

Operation of the Wire 80

Further, the rotation in the unwinding direction of the spool 20 relative to the first lock base 34 or 158 as described above means relative rotation of the first lock base 34 or 158 with respect to the spool 20 in the winding direction. Accordingly, when the first lock base 34 or 158 rotates in the winding direction relative to the spool 20, while the one end of the wire 80 stays inserted in the wire anchoring hole 84 that is formed in the first lock base 34 or 158, the wire 80 is pulled on while being guided in the wire guide channel 82 of the first lock base 34 or 158 (see FIGS. 7A to 9).

Now, while the length direction of the wire 80 inside the stopper accommodation hole 68 runs along the axial direction of the spool 20, the direction in which the wire 80 is pulled by the first lock base 34 or 158 is the winding direction. Therefore, as shown in FIG. 7B, until the wire 80 which is being pulled by the first lock base 34 or 158 is completely disengaged from the large diameter portion 72, the wire 80 follows the wire guide channel 82 while being firmly pulled against an edge of the opening end at the first lock base 34 or 158 side of the large diameter portion 72, and the wire 80 is deformed such that the length direction thereof is changed to the length direction of the wire guide channel 82, which is to say, the circumferential direction of rotation of the spool 20.

As a result, the restraining force on the occupant from the webbing belt 22 is also slightly weakened when the wire 80 is pulled on and deformed, and the energy that is provided by the pulling of the webbing belt 22 is absorbed in an amount corresponding to the deformation of the wire 80. Thus, an energy absorption amount corresponding to the deformation of the wire 80 is added to the energy absorption amount corresponding to the twisting of the first deformation portion 28, and it is possible to effectively absorb the energy that is provided by the pulling of the webbing belt 22.

Operation of the Second Locking Mechanism 44

Further, when some or all of the wire 80 is drawn out from the stopper accommodation hole 68 by the relative rotation of the first lock base 34 or 158 with respect to the spool 20 as described above, the other end portion of the wire 80 moves away from the one end of the stopper 74. Accordingly, when the other end of the wire 80 moves away from the one end of the stopper 74, the stopper 74 is moved toward the first lock base 34 or 158, so as to follow the wire 80, by the urging force of the stopper-urging spring 78.

When the stopper 74 moves toward the first lock base 34 or 158, the other end portion of the stopper 74, which was inserted in the spring accommodation hole 62, passes out through the through-hole 66 and is withdrawn from the spring accommodation hole 62. When the stopper 74 is disengaged from inside the spring accommodation hole 62, the interference of the stopper 74 with the plate 60 is released. The plate 60 which is no longer being interfered with by the stopper 74 is subject to the urging force of the rotating disc-urging spring 64, and turns in the spring accommodation hole 62.

Because the plate 60 is integral with the rotating disc 54, when the plate 60 is turned by the urging force of the rotating disc-urging spring 64, the rotating disc 54 rotates in the winding direction with respect to the second lock base 46. When the rotating disc 54 rotates in the winding direction relative to the second lock base 46, the guidance pins 56 push against the inner walls of the long holes 58, and the second locking pawls 50 turn the one way about the pawl support pins 52.

When the second locking pawls 50 turn in this manner, the distal ends of the second locking pawls 50 protrude to outside the second lock base 46, and the second locking pawl ratchets 94 mesh with the internal ratchet 92 of the locking ring 90.

Meanwhile, the spool 20 which is being pulled on by the webbing belt 22 is acting to turn in the unwinding direction. Therefore, the second locking pawls 50 act to turn in the unwinding direction together with the second lock base 46.

Accordingly, a rotation force of the second lock base 46 in the unwinding direction is transmitted to the locking ring 90 with which the second locking pawls 50 are meshing, and the locking ring 90 acts to rotate in the unwinding direction. In this state, provided the ring-locking ratchet 100 of the ring-locking pawl 98 is meshed with the external ratchet 96, the ring-locking pawl 98 interferes with the inner wall of the ring-locking pawl accommodation hole 97. Thus, rotation of the ring-locking pawl 98, and hence of the locking ring 90, in the unwinding direction is restricted.

When the restriction on rotation of the locking ring 90 in the unwinding direction is realized, rotation of the second lock base 46 in the unwinding direction is also restricted. In this state, if a rotation force on the spool 20 in the unwinding direction, in accordance with tension force while the body of the occupant is pulling on the webbing belt 22, exceeds a total of the mechanical strength of the first deformation portion 28 and the mechanical strength of the second deformation portion 40, the second deformation portion 40 is twisted in conjunction with the first deformation portion 28, in a state in which the second connecting portion 42 stays joined with the second lock base 46, and the spool 20 rotates in the unwinding direction by an amount corresponding to this twisting.

As a result, the webbing belt 22 unwinds from the spool 20 by an amount corresponding to the amount of rotation of the spool 20 in the unwinding direction. Consequently, the restraining force on the occupant from the webbing belt 22 is slightly weakened, and the energy supplied by the pulling of the webbing belt 22 is absorbed in an amount corresponding to the above-mentioned twisting deformation.

Now, before the first locking mechanism 32 or 156 operates, if, in accordance with the vehicle entering a sharp deceleration state or a state immediately prior to a sharp deceleration and a signal from the build-sensing means, the ECU judges that the body of the occupant sitting on the seat is less than the pre-specified standard value and the ECU accordingly outputs the ignition signal, the gas generator 114 operates. When the gas generator 114 operates, the push plunger 118 protrudes, and the pushed portion 112 of the support arm 104 pushes against the push plunger 118.

Because the shear pin 110 abuts against the support arm 104, turning of the support arm 104 the one way about the arm support pin 106 is restricted. However, when the support arm 104 is subject to pushing force from the push plunger 118, the support arm 104 acts to turn the one way about the arm support pin 106, and the support arm 104 breaks the shear pin 110 with this turning force.

The support arm 104, the rotation restriction of which by the shear pin 110 has been forcibly canceled, turns the one way about the arm support pin 106 because of the pushing force from the push plunger 118. When the support arm 104 turns thus, the ring-locking pawl 98 loses the support from the support portion 108, and the ring-locking ratchet 100 of the ring-locking pawl 98 acts to fall downward under the weight of the ring-locking pawl 98. When the ring-locking ratchet 100 acts to fall, a side of the ring-locking pawl 98 that is opposite from the side thereof at which the ring-locking ratchet 100 is provided is guided to move by the ring-locking pawl accommodation hole 97. Thus, the meshing of the ring-locking ratchet 100 with the external ratchet 96 is released.

In this state, when the rotation force on the spool 20 in the unwinding direction is transmitted to the locking ring 90 via the second lock base 46 and the second locking pawls 50, the locking ring 90 turns in the unwinding direction together with the spool 20. Thus, in this state, twisting occurs at the first deformation portion 28 but twisting does not occur at the second deformation portion 40. Therefore, in this state, energy absorption is not caused by twisting deformation of the second deformation portion 40.

That is, in the present embodiment, with either of the basic structure and the variant structure, it is possible, by controlling the gas generator 114, to select and switch between a mode in which deformation is caused in the second deformation portion 40 and a mode in which deformation is not caused in the second deformation portion 40. As a result, it is possible to perform suitable energy absorption in accordance with the physical build of the occupant to whom the webbing belt 22 is applied, or the like.

Furthermore, in the present embodiment, the structure of the first locking mechanism differs between the basic structure and the variant structure. However, the basic structure and the variant structure are both structures in which the second locking mechanism 44 is operated by the spool 20 rotating in the unwinding direction relative to the first lock base 34 or 158. Therefore, as long as the first lock base 34 or 158 is a structure which is relatively rotated with respect to the spool 20 by twisting of the first deformation portion 28, substantially the same constitution can be applied to the second locking mechanism 44 regardless, in general, of specific structure of the first locking mechanism.

Further, the present embodiment is a structure which releases a restriction on movement of the plate 60 by the stopper 74 by drawing out the wire 80 as described above, and also realizes energy absorption by deformation of the wire 80. However, a structure is also possible in which energy absorption is not realized by resilient deformation of the above-mentioned wire 80 when the movement restriction of the plate 60 is to be released, which is to say, a structure in which relative rotation between the spool 20 and the first lock base 34 or 158 simply releases the movement restriction of the stopper 74, and the stopper 74 is moved by the urging force of the stopper-urging spring 78.

Structure of Second Embodiment

Now, other embodiments of the present invention will be described. In the following descriptions of each embodiment, portions that are basically the same as in any previously described embodiment, including the above-described first embodiment, are assigned the same reference numerals and descriptions thereof are not given.

Figure 10:
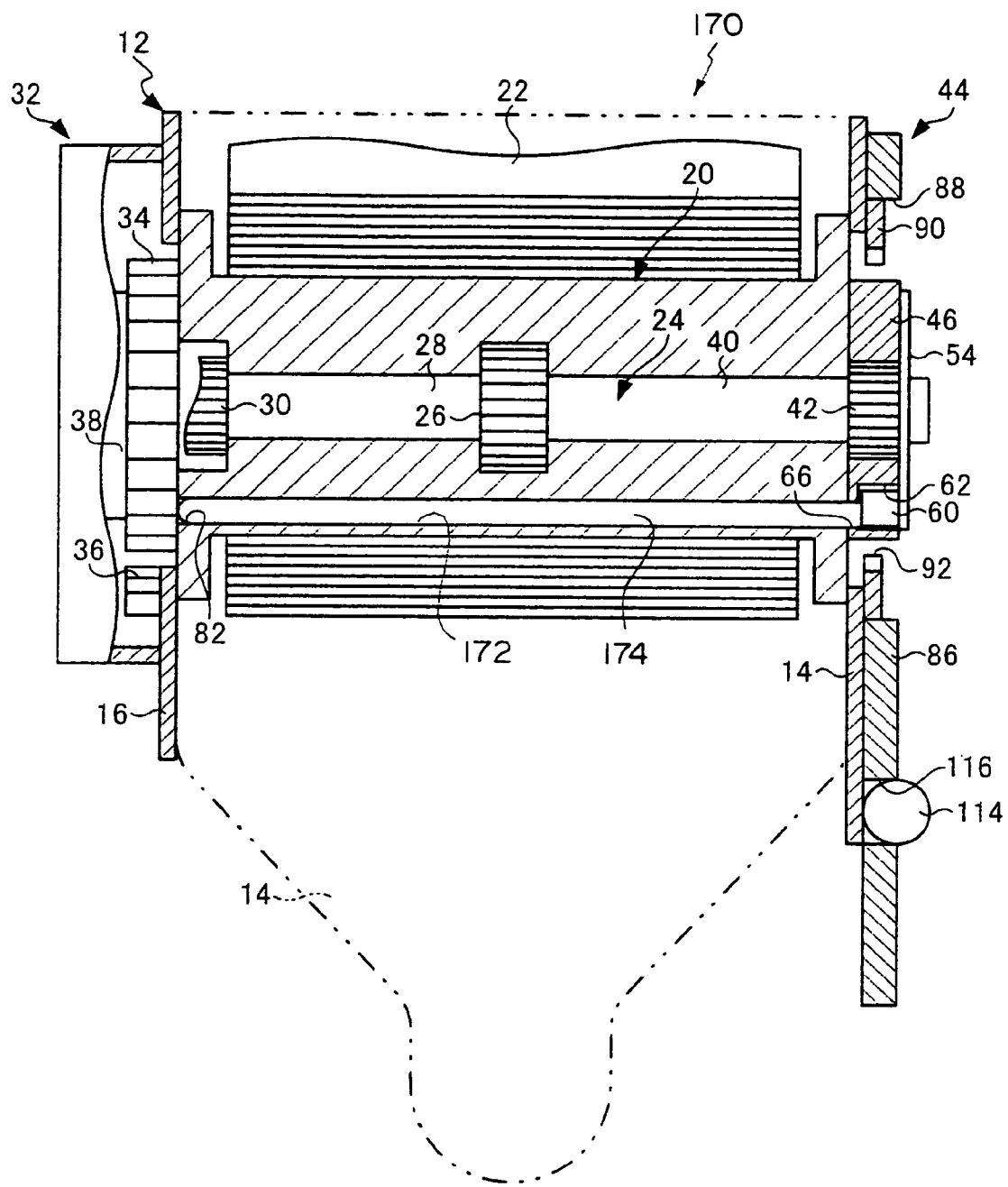
FIG. 10 is a front sectional view showing general structure of a webbing winding device relating to a second embodiment of the present invention.
Figure 11:
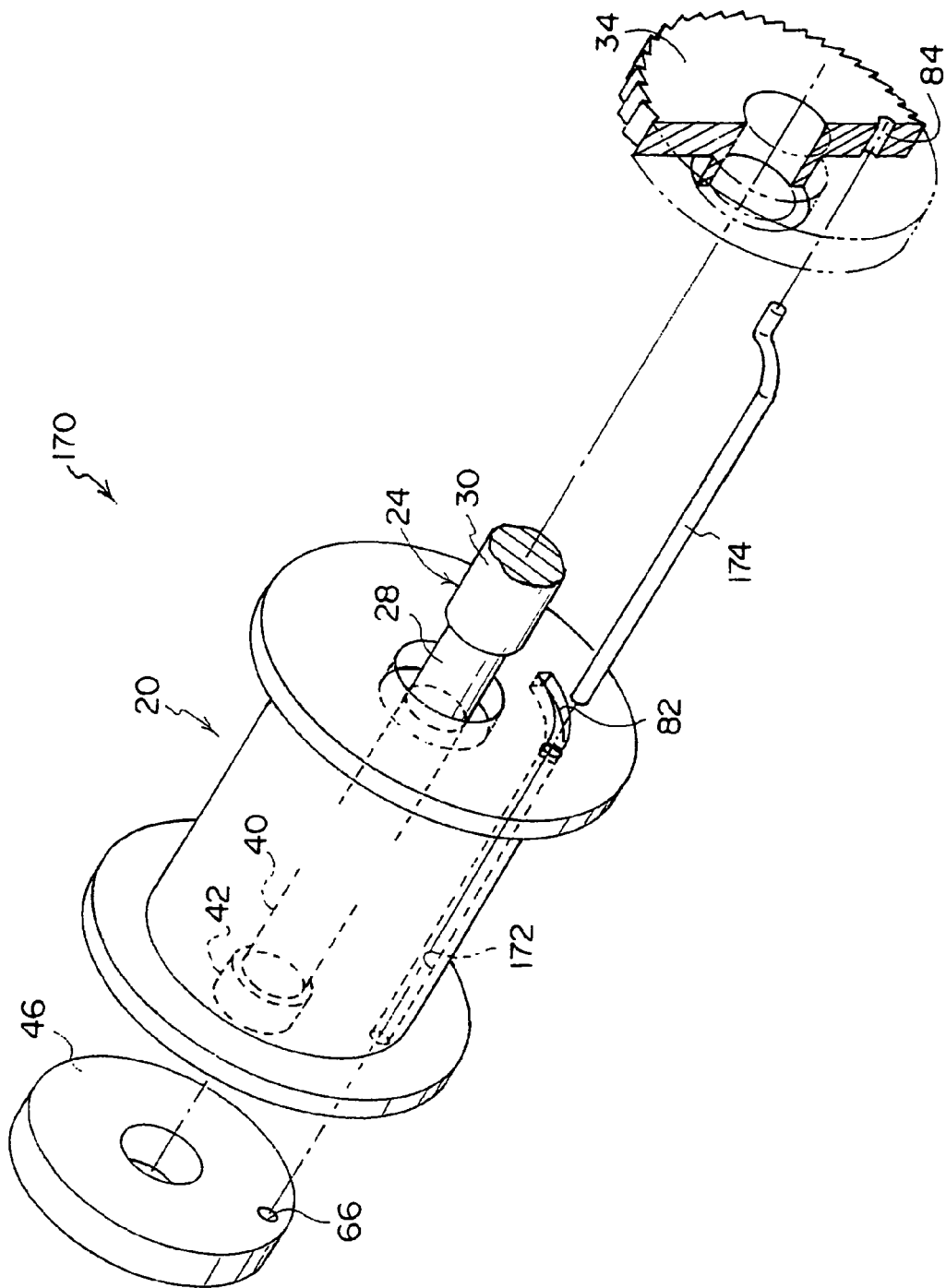
FIG. 11 is an exploded perspective view showing structure of principal components of a webbing winding device relating to the second embodiment of the present invention.

FIG. 10 shows structure of a webbing winding device 170 relating to a second embodiment of the present invention, which corresponds to the webbing winding device 10 relating to the basic structure of the first embodiment, in a sectional view. FIG. 11 shows structure of principal elements of the webbing winding device 170 in an exploded perspective view. As shown in these drawings, the webbing winding device 170 is provided with the spool 20, but rather than the stopper accommodation hole 68 being formed in the spool 20, a stopper accommodation hole 172 is formed instead.

The stopper accommodation hole 172 is similar to the stopper accommodation hole 68 of the first embodiment in that the stopper accommodation hole 172 is parallel with the axis of the spool 20, one end of the stopper accommodation hole 172 opens out at the end portion at the second lock base 46 side of the spool 20, and the other end of the stopper accommodation hole 172 opens out at the floor portion of the large diameter portion 72. However, whereas the stopper accommodation hole 68 of the first embodiment is constituted by the small diameter portion 70 and the large diameter portion 72 which are mutually coaxial but have different internal diameter dimensions, an internal diameter dimension of the stopper accommodation hole 172 does not change from the one end to the other end thereof.

Moreover, the webbing winding device 170 is not provided with the wire 80, the stopper-urging spring 78 and the stopper 74, but is instead provided with a stopper wire 174, which serves as the second energy-absorbing member and the control mechanism. A main body portion of the stopper wire 174, which is formed in a rod shape, is accommodated in the stopper accommodation hole 172. One end portion of the stopper wire 174 protrudes out from the stopper accommodation hole 172 through the opening end at the first lock base 34 side of the stopper accommodation hole 172.

The one end portion of the stopper wire 174 which is protruded from the stopper accommodation hole 172 passes into the wire guide channel 82 and curves along the wire guide channel 82, similarly to the wire 80 of the first embodiment. Further, the one end portion of the stopper wire 174 is inflected toward the first lock base 34 in the wire guide channel 82 and passes into the wire anchoring hole 84, similarly to the wire 80.

Meanwhile, the other end portion of the stopper wire 174 protrudes to the outside of the spool 20 from the end portion of the stopper accommodation hole 172 at the second lock base 46 side thereof. Hence, the stopper wire 174 passes through the through-hole 66 and passes into the spring accommodation hole 62 at the side of the plate 60 that is opposite from the side thereof at which the rotating disc-urging spring 64 is provided. Thus, the other end of the stopper wire 174 interferes with the plate 60 which acts to turn because of the urging force of the rotating disc-urging spring 64 (see FIGS. 8 and 9).

That is, the stopper wire 174 can be understood as a structure in which the other end side (the second lock base 46 side) of the wire 80 is extended, protrudes from the spool 20 and passes through the through-hole 66, and thus the other end of the wire 80 replaces the stopper 74.

Actions and Effects of the Second Embodiment

Next, actions and effects of the present embodiment will be described.

In the webbing winding device 170, similarly to the webbing winding device 10 relating to the first embodiment, when the vehicle sharply decelerates and the first locking mechanism 32 operates, rotation of the rotating member 38 in the unwinding direction is restricted. In this state, if the webbing belt 22 is pulled on by the body of the occupant acting to inertially move substantially toward the front side of the vehicle and as a result the first lock base 34 rotates in the winding direction relative to the spool 20, the stopper wire 174 of which one end is inserted into the wire anchoring hole 84 is pulled on while being guided by the wire guide channel 82, similarly to the wire 80 of the first embodiment.

Accordingly, similarly to the wire 80, the portion of the stopper wire 174 that is accommodated in the stopper accommodation hole 172 follows the wire guide channel 82 while being firmly pulled against the edge of the opening end at the first lock base 34 side of the stopper accommodation hole 172, and the stopper wire 174 is deformed such that the length direction thereof is changed to the length direction of the wire guide channel 82, that is, the circumferential direction of rotation of the spool 20.

Meanwhile, when the stopper wire 174 inside the stopper accommodation hole 172 moves toward the first lock base 34 in this manner, the other end portion of the stopper wire 174, which was inserted into the spring accommodation hole 62, passes out through the through-hole 66 and is withdrawn from inside the spring accommodation hole 62, and is pulled into the stopper accommodation hole 172 through the second lock base 46 side end portion of the stopper accommodation hole 172. Accordingly, when the stopper wire 174 is disengaged from inside the spring accommodation hole 62, interference of the stopper wire 174 with the plate 60 is released. The plate 60 which is no longer being interfered with by the stopper wire 174 is subject to the urging force of the rotating disc-urging spring 64, and turns in the spring accommodation hole 62. As a result, similarly to the first embodiment, the second locking pawl ratchets 94 mesh with the internal ratchet 92 of the locking ring 90.

Thus, the stopper wire 174 of the webbing winding device 170 both performs a function equivalent to the wire 80 of the first embodiment and performs a function equivalent to the stopper 74. Therefore, it is possible, by providing the webbing winding device 170 with the stopper wire 174, to obtain effects the same as by providing the wire 80 and the stopper 74.

Furthermore, although the webbing winding device 170 is a structure which corresponds to the webbing winding device 10 relating to the basic structure of the first embodiment, the webbing winding device 170 is provided with the stopper wire 174 in place of the wire 80 and the stopper 74. Therefore, it is also possible to realize the same functions, and thus to provide the same effects, as the webbing winding device 170 with a structure that corresponds to the webbing winding device 150 relating to the variant structure of the first embodiment, by forming the stopper accommodation hole 172 in the spool 20 thereof and providing the stopper wire 174. That is, for the present embodiment, as long as the first lock base 34 or 158 is a structure which relatively rotates with respect to the spool 20, substantially the same constitution can be applied to the second locking mechanism 44 regardless, in general, of specific structure of the first locking mechanism.

Further yet, in comparison with the first embodiment which employs the stopper 74, the stopper-urging spring 78 and the wire 80, the number of components can be made smaller for the webbing winding device 170 and assembly costs can be reduced, in addition to which component costs and assembly costs can be lowered. Further still, in comparison with the first embodiment, in the webbing winding device 170 relating to the present embodiment, the stopper accommodation hole 172 formed in the spool 20 differs from the stopper accommodation hole 68, with it being possible for the inner diameter dimension to be the same from the one end to the other end in the axial direction of the spool 20.

Therefore, the webbing winding device 170 in which the stopper accommodation hole 172 is formed in the spool 20 can be formed with a smaller number of production steps than in the case of forming the stopper accommodation hole 68, and production costs can be lowered. Further again, in the present embodiment, the stopper wire 174 which is drawn out through the first lock base 34 side end portion of the stopper accommodation hole 172 is the same as the stopper wire 174 which is pulled into the stopper accommodation hole 172 through the second lock base 46 side end portion of the stopper accommodation hole 172 (i.e., a single body).

Therefore, there is no difference in commencement timings between when the stopper wire 174 is drawn out from the stopper accommodation hole 172 and when the stopper wire 174 is drawn into the stopper accommodation hole 172. Moreover, when the stopper wire 174 is drawn out from the stopper accommodation hole 172, the stopper wire 174 is reliably pulled into the stopper accommodation hole 172. Thus, in the present embodiment, it is possible to operate the second locking mechanism 44 quickly and reliably after the first lock base 34 commences relative rotation with respect to the spool 20.

Structure of Third Embodiment

Next, as a third embodiment of the present invention, a variant example of the second locking mechanism 44 of the first embodiment and the second embodiment will be described.

Figure 12:
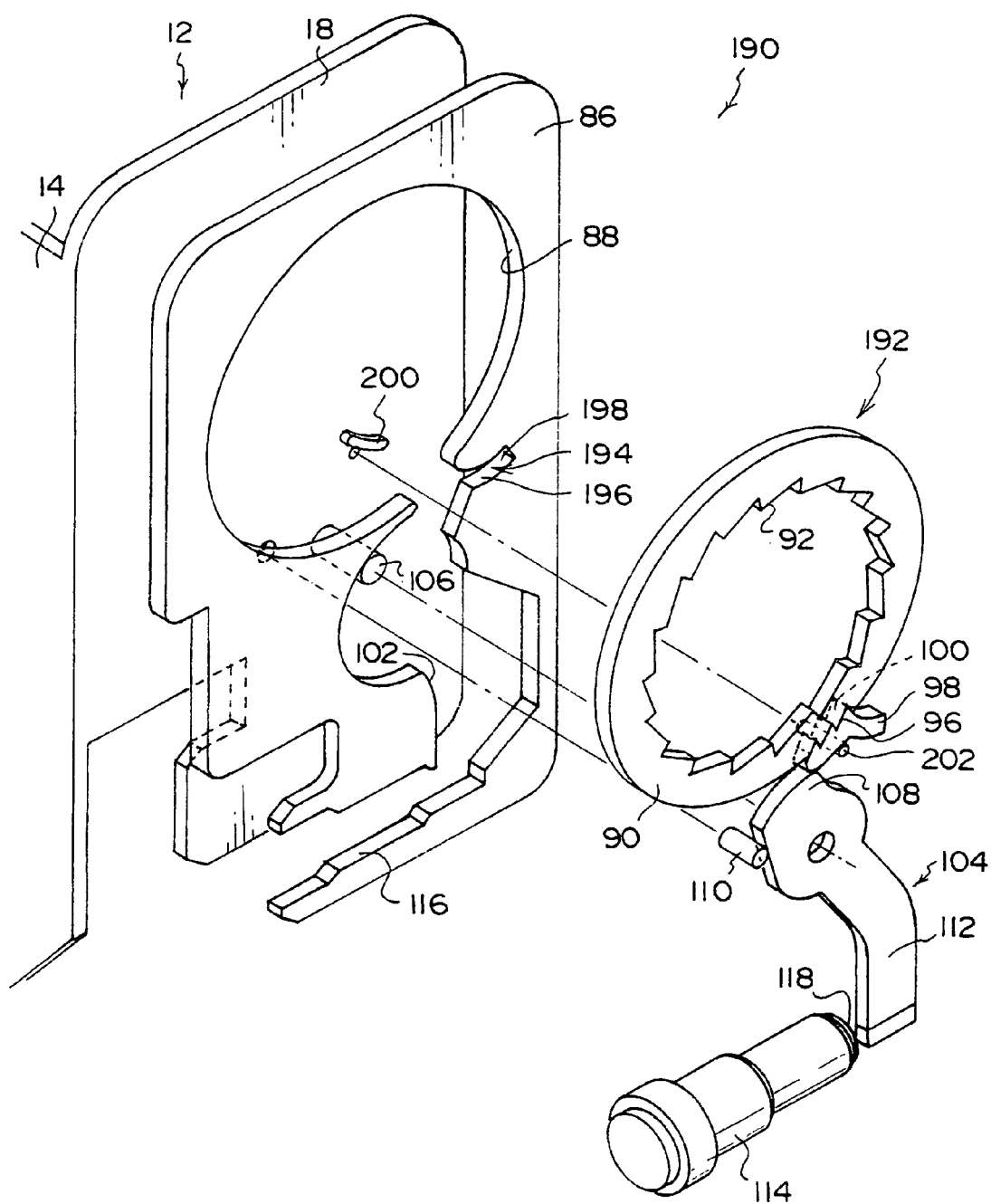
FIG. 12 is an exploded perspective view showing structure of principal components of a webbing winding device relating to a third embodiment of the present invention.
Figure 13:
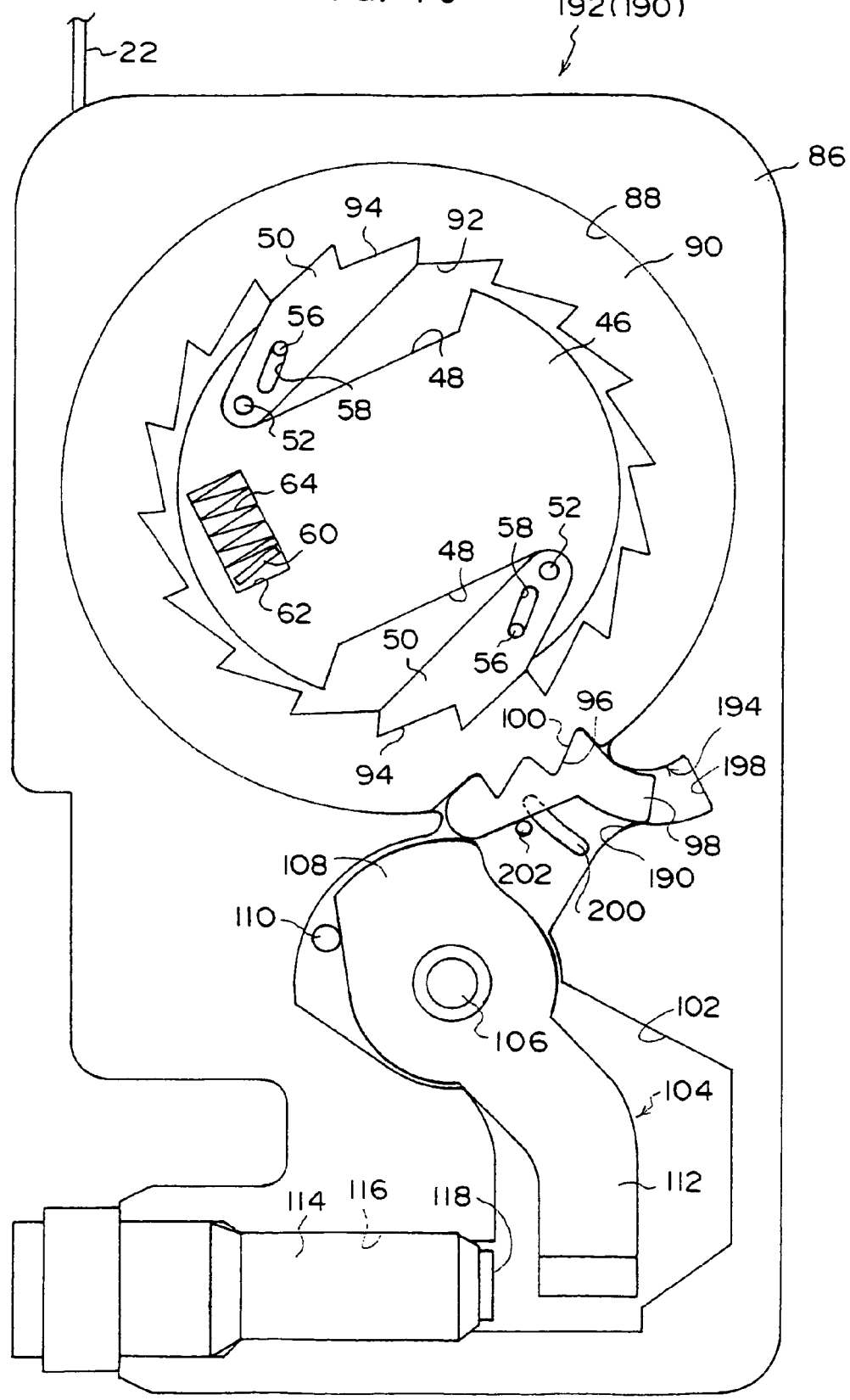
FIG. 13 is a front view showing an operational state of a second locking mechanism.

FIG. 12 shows structure of principal components of a webbing winding device 190 relating to the present embodiment in an exploded perspective view. FIG. 13 shows structure of the principal components of the webbing winding device 190 in a front view.

As shown in these drawings, the webbing winding device 190 is provided with a second locking mechanism 192 in place of the second locking mechanism 44 of the first and second embodiments. The second locking mechanism 192 is provided with the ring-locking pawl 98. However, in the generator base 86 that structures the webbing winding device 190, a ring-locking pawl accommodation hole 194 is formed to serve as a guide structure in place of the ring-locking pawl accommodation hole 97.

The ring-locking pawl accommodation hole 194 is basically similar to the ring-locking pawl accommodation hole 97, in being formed to be capable of guiding the side of the ring-locking ratchet 100 that is opposite from the side thereof at which the ring-locking pawl 98 is provided in a direction for moving the ring-locking ratchet 100 of the ring-locking pawl 98 away from the external ratchet 96. However, of a wall face 196 at a lower side of the ring-locking pawl accommodation hole 194, an opening end side of the ring-locking pawl accommodation hole 194 (the side of the ring-locking pawl accommodation hole 194 which is opposite from a side thereof at which a floor face 198 is provided) is located further downward relative to the ring-locking pawl 98 than a position against which the ring-locking pawl 98 abuts in an initial state.

Further, the opening end of the ring-locking pawl accommodation hole 194 is located at the lower side relative to the floor face 198. Therefore, when the support of the support portion 108 is removed and the ring-locking pawl 98 acts to move downward from the initial position thereof under its own weight, the wall face 196 of the ring-locking pawl accommodation hole 194 guides the ring-locking pawl 98 toward the floor face 198, but when the ring-locking pawl 98 that has moved toward the floor face 198 returns to the opening end side of the ring-locking pawl accommodation hole 194, the wall face 196 guides the ring-locking pawl 98 downward relative to the initial position thereof.

Figure 14:
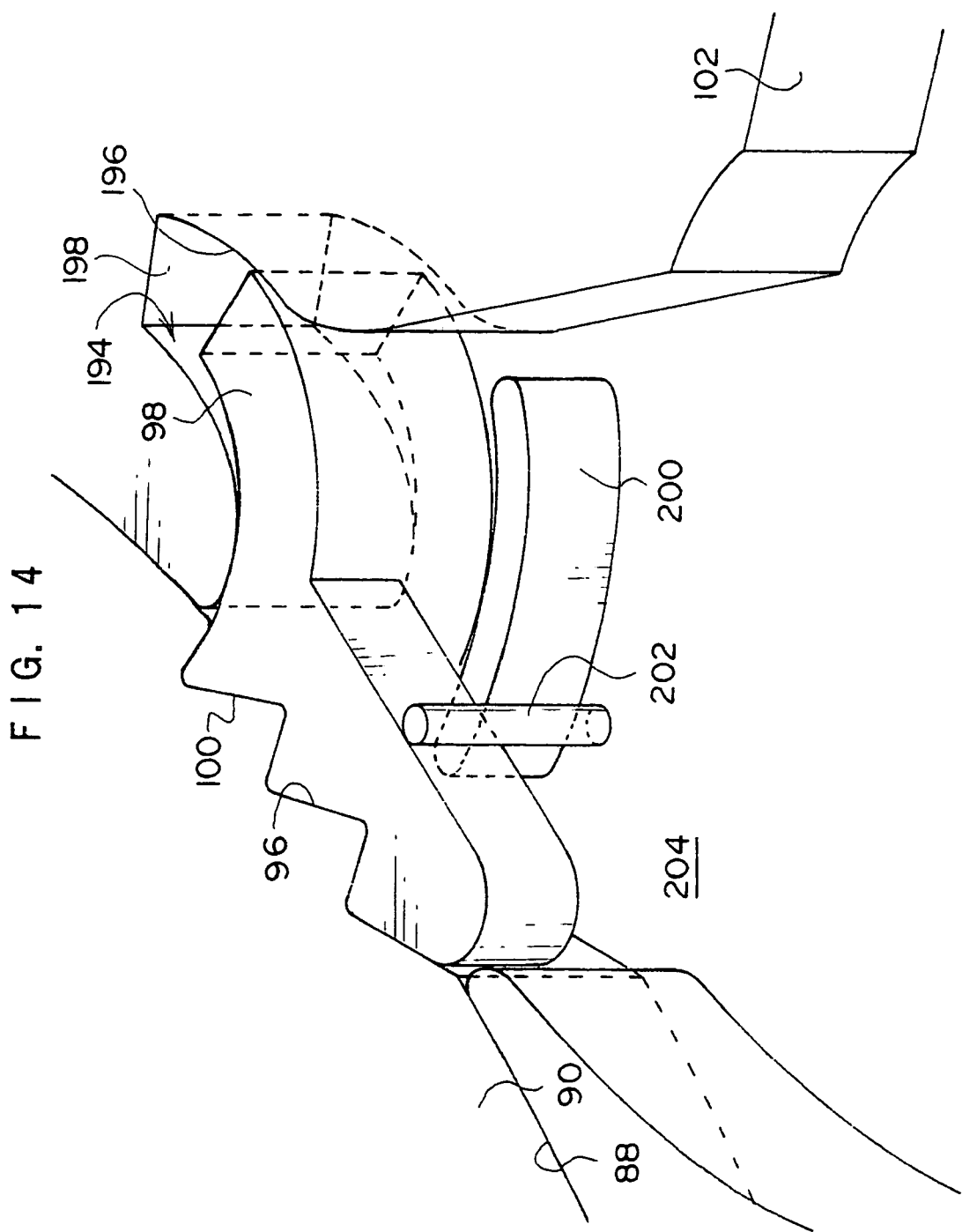
FIG. 14 is a perspective view showing a state in which a second switching member is retained by a blocking member.

As is shown in FIGS. 12 to 14, in the webbing winding device 190, a guide rib 200 is formed at a face of the leg plate 18 at the side thereof that is opposite from the side at which the leg plate 16 is provided. A face of the ring-locking pawl 98 at the leg plate 18 side thereof abuts against an end portion of the guide rib 200. A cavity between the leg plate 18 and the ring-locking pawl 98, which corresponds with a height of the guide rib 200, serves as a clearance cavity 204. Consequently, the ring-locking pawl 98 is separated and disposed away from the leg plate 18 by an amount corresponding to the height of the guide rib 200, and when the ring-locking pawl 98 moves toward the floor face 198 of the ring-locking pawl accommodation hole 194, the ring-locking pawl 98 moves in a state in which the ring-locking pawl 98 stays separated from the leg plate 18 by the amount corresponding to the height of the guide rib 200.

A shear pin 202, which serves as a blocking member, is formed at the leg plate 18 directly after the ring-locking pawl 98 has been assembled. The shear pin 202 supports the ring-locking pawl 98 that has been assembled, from the lower side of the ring-locking pawl 98. A mechanical strength of the shear pin 202 is specified such that the shear pin 202 is broken from the root (base end side) thereof by an external force of the order of, for example, the weight of the ring-locking pawl 98. A maximum dimension of the shear pin 202 along a direction intersecting the direction of protrusion of the shear pin 202 from the leg plate 18 (that is, a maximum outer diameter dimension of the shear pin 202) is set to be smaller than the height of the guide rib 200 standing from the leg plate 18.

Actions and Effects of the Third Embodiment

Actions and Effects of the Webbing Winding Device 190 from an Operational Perspective Next, actions and effects of the present embodiment in regard to operations will be described.

In this webbing winding device 190, similarly to the first embodiment, before the first locking mechanism 32 or 156 operates, if, in accordance with the vehicle entering a sharp deceleration state or a state immediately prior to a sharp deceleration and a signal from the build-sensing means, the ECU judges that the body of the occupant sitting on the seat is less than the pre-specified standard value and the ECU accordingly outputs the ignition signal, the gas generator 114 operates. When the gas generator 114 operates, the push plunger 118 protrudes, and the pushed portion 112 of the support arm 104 pushes against the push plunger 118.

The support portion 108 of the support arm 104, of which the pushed portion 112 is pushed by the push plunger 118, breaks the shear pin 110, and the support arm 104 turns the one way about the arm support pin 106. When the support arm 104 turns, the support of the side of the ring-locking ratchet 100 of the ring-locking pawl 98 from the support portion 108 is lost. In this state, the rotation force on the spool 20 in the unwinding direction is transmitted, via the second lock base 46 and the second locking pawls 50, to the locking ring 90, and the locking ring 90 turns in the unwinding direction.

At this time, the external ratchet 96 of the locking ring 90 pushes against the ring-locking ratchet 100 of the ring-locking pawl 98. The ring-locking pawl 98 pushes against the shear pin 202 with both the pushing force that the ring-locking ratchet 100 receives from the external ratchet 96 and the weight of the ring-locking pawl 98. As a result, the shear pin 202 breaks off from the root (base end side) thereof. When the shear pin 202 is broken thus, the support of the ring-locking pawl 98 from the shear pin 202 is removed and the ring-locking pawl 98 acts to fall downward (that is, to move away from the predetermined position thereof).

A downward-facing side face of the ring-locking pawl 98 that is acting to move downward in this manner abuts against the wall face 196, is guided by the wall face 196, and slides toward the floor face 198. Thus, meshing of the ring-locking ratchet 100 with the external ratchet 96 is released.

In this state, when the rotation force of the spool 20 in the unwinding direction is transmitted via the second lock base 46 and the second locking pawls 50 to the locking ring 90, the locking ring 90 turns in the unwinding direction along with the spool 20. Accordingly, in this state, twisting occurs in the first deformation portion 28, but twisting does not occur in the second deformation portion 40. Therefore, in this state, energy absorption due to twisting deformation of the second deformation portion 40 does not occur.

Thus, in the present embodiment too, similarly to the first embodiment, it is possible, by controlling the gas generator 114, to select and switch between a mode in which deformation is caused in the second deformation portion 40 and a mode in which deformation is not caused in the second deformation portion 40. As a result, it is possible to perform suitable energy absorption in accordance with the physical build of the occupant to whom the webbing belt 22 is applied, or the like.

Now, when, for example, the ring-locking pawl 98 which is being guided by the wall face 196 and sliding toward the floor face 198 abuts against the floor face 198, the ring-locking pawl 98 slides back toward the opening side of the ring-locking pawl accommodation hole 194 (toward the end portion of the ring-locking pawl accommodation hole 194 at the side thereof that is opposite from the side at which the floor face 198 is provided) because of an impact when the ring-locking pawl 98 abuts against the floor face 198 (that is, the ring-locking pawl 98 acts to return to the position thereof before the downward movement). Herein, the ring-locking pawl 98 touches against the wall face 196 while being guided along the wall face 196 to move toward the floor face 198. Therefore, friction occurs between the ring-locking pawl 98 and the wall face 196.

In addition, an area of contact between the ring-locking pawl 98 and the wall face 196 becomes larger as the ring-locking pawl 98 approaches the floor face 198. Therefore, the closer the ring-locking pawl 98 comes to the floor face 198, the greater the friction between the ring-locking pawl 98 and the wall face 196. Because the ring-locking pawl 98 which has lost the support of the support portion 108 is basically moved only by gravity, a speed of movement of the ring-locking pawl 98 falls in accordance with the increase in friction between the ring-locking pawl 98 and the wall face 196. Therefore, after the impact when the ring-locking pawl 98 abuts against the floor face 198, a sliding speed when the ring-locking pawl 98 starts to back-slide is substantially slower than the sliding speed of the ring-locking pawl 98 immediately after the support of the support portion 108 is removed and the ring-locking pawl 98 starts to descend. Therefore, the ring-locking pawl 98 will basically not be able to return to the initial position thereof (that is, the position prior to moving downward).

Moreover, as mentioned above, the wall face 196 guides the ring-locking pawl 98 that is back-sliding to downward relative to the initial position of the ring-locking pawl 98. In other words, in the present embodiment, a sliding path of the ring-locking pawl 98 when back-sliding is located lower than a sliding path of the ring-locking pawl 98 moving toward the floor face 198. As a result of this too, the ring-locking pawl 98 will not be able to return to the initial position thereof.

Further yet, because the sliding path of the ring-locking pawl 98 when back-sliding is at the lower side relative to the sliding path of the ring-locking pawl 98 moving toward the floor face 198, the ring-locking pawl 98 that is being guided by the wall face 196 and back-sliding abuts against a side face of the support portion 108, and further back-sliding is restricted. As a result of this too, the ring-locking pawl 98 will not be able to return to the initial position thereof.

Thus, because the ring-locking pawl 98 cannot return to the initial position thereof in the present embodiment, the ring-locking ratchet 100 of the ring-locking pawl 98 that has slid back will not again mesh with the external ratchet 96. Therefore, it is possible to reliably switch from the mode in which deformation is caused in the second deformation portion 40 to the mode in which deformation is not caused in the second deformation portion 40.

Figure 15:
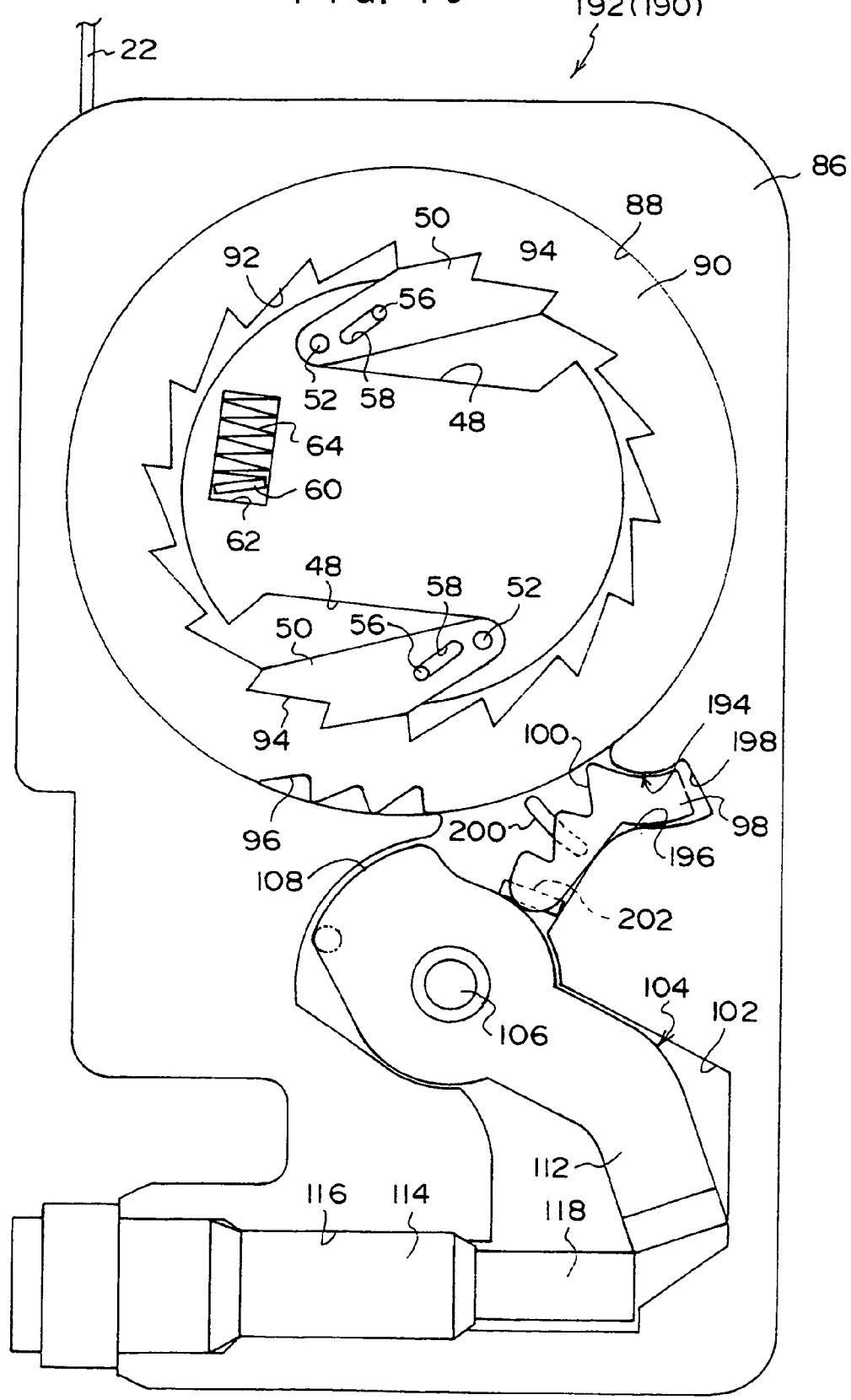
FIG. 15 is a front view showing an operational state of a lock-release mechanism.
Figure 16:
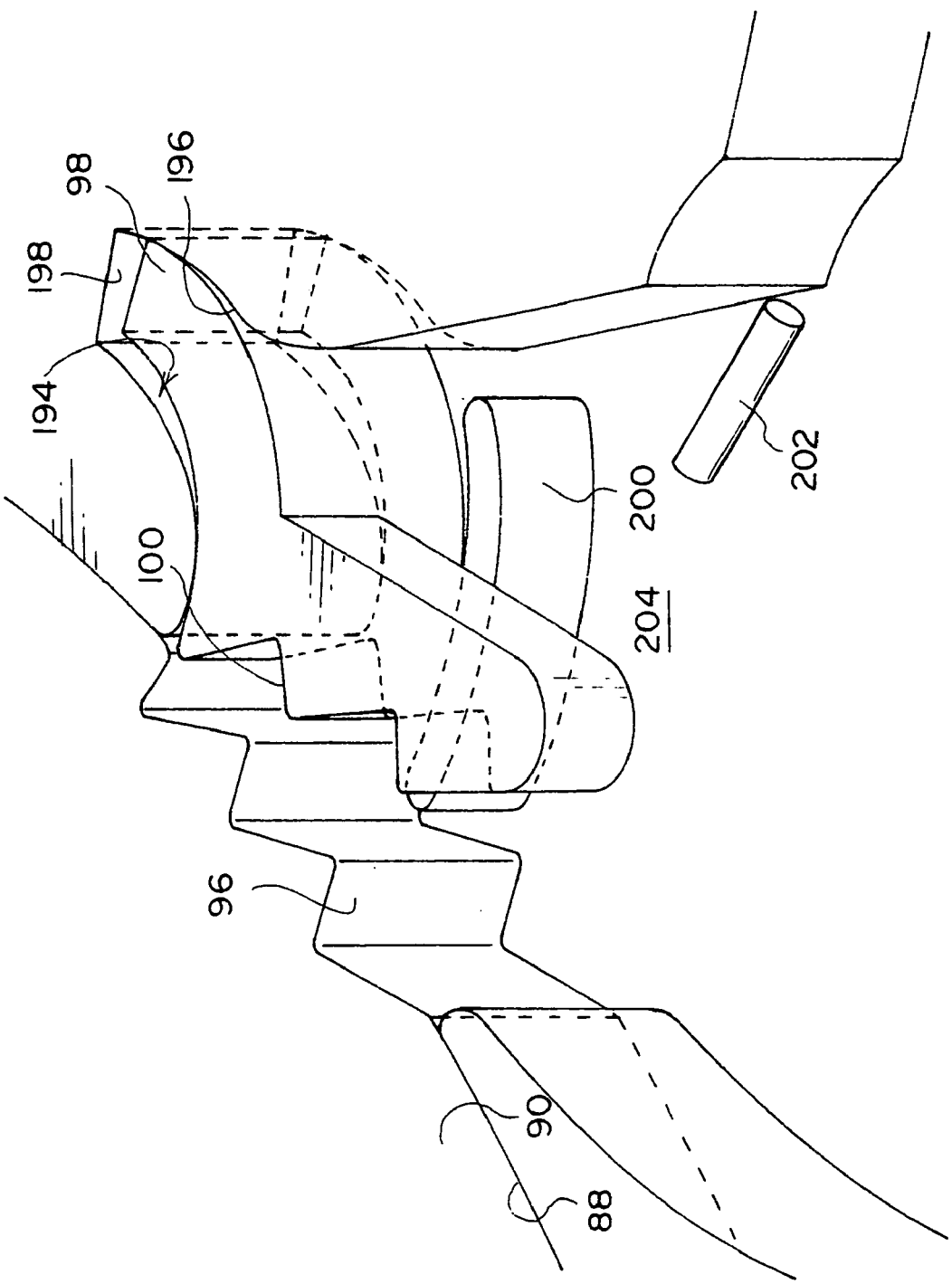
FIG. 16 is a perspective view showing a state in which the blocking member has been broken.

Meanwhile, after the ring-locking pawl 98 has broken the shear pin 202, the broken shear pin 202 is not removed but remains in the vicinity of the ring-locking pawl 98, as shown in FIGS. 15 and 16.

Here, the maximum dimension of the shear pin 202 along the direction intersecting the direction of protrusion of the shear pin 202 from the leg plate 18 (that is, the maximum outer diameter dimension of the shear pin 202) is smaller than the height to which the guide rib 200 stands from the leg plate 18, that is, is smaller than the spacing of the clearance cavity 204. Consequently, as shown in FIG. 15, the shear pin 202 remains in the vicinity of the ring-locking pawl 98 with an attitude which is angled with respect to the previous direction of protrusion, and the shear pin 202 is disposed at the leg plate 18 side relative to the distal end of the guide rib 200.

Therefore, when the support of the shear pin 202 is removed and the ring-locking pawl 98 slidingly moves, the shear pin 202 is disposed at the leg plate 18 side relative to the sliding paths of the ring-locking pawl 98, and the shear pin 202 will not interfere with the ring-locking pawl 98 that is slidingly moving. Thus, the ring-locking pawl 98 can be reliably allowed to slide.

Now, the present embodiment is a structure in which the shear pin 202 remains in a state subsequent to assembly of the webbing winding device 190, and the ring-locking pawl 98 can be supported by the shear pin 202. However, at the time of assembly of the webbing winding device 190, the shear pin 202 may be intentionally broken after the ring-locking pawl 98 has been supported by the support portion 108.

If such an assembly method is employed, even though the broken shear pin 202 is retained rather than being removed, as described above, the broken shear pin 202 will not cause an obstruction to movement of the ring-locking pawl 98. Therefore, there is no need to attempt to remove the shear pin 202 when the shear pin 202 has been broken, and ease of labor when the shear pin 202 is broken can be improved.

Further, a relationship similar to that of the above-described shear pin 202 and ring-locking pawl 98 may also be applied to, for example, the relationship of the support arm 104 and the shear pin 110. Basically, with a structure in which a movable member is disposed at an initial position and alters a predetermined state of a mechanism by moving in a predetermined direction, and a restriction member such as a shear pin or the like is abutted against the movable member and the restriction member retains the movable member at the initial position, by employing a structure similar to the above-described shear pin 202 and ring-locking pawl 98—that is, a structure in which the restriction member that has been broken is accommodated sideward of a movement path of the movable member and the restriction member is cleared from the movement path of the movable member to prevent interference of the restriction member with the movable member—actions similar to the actions described above can be realized, and effects similar to the effects described above can be obtained.

Structure of Fourth Embodiment

Next, as a fourth embodiment of the present invention, a variant example of the second locking mechanism 192 of the third embodiment will be described.

Figure 17:
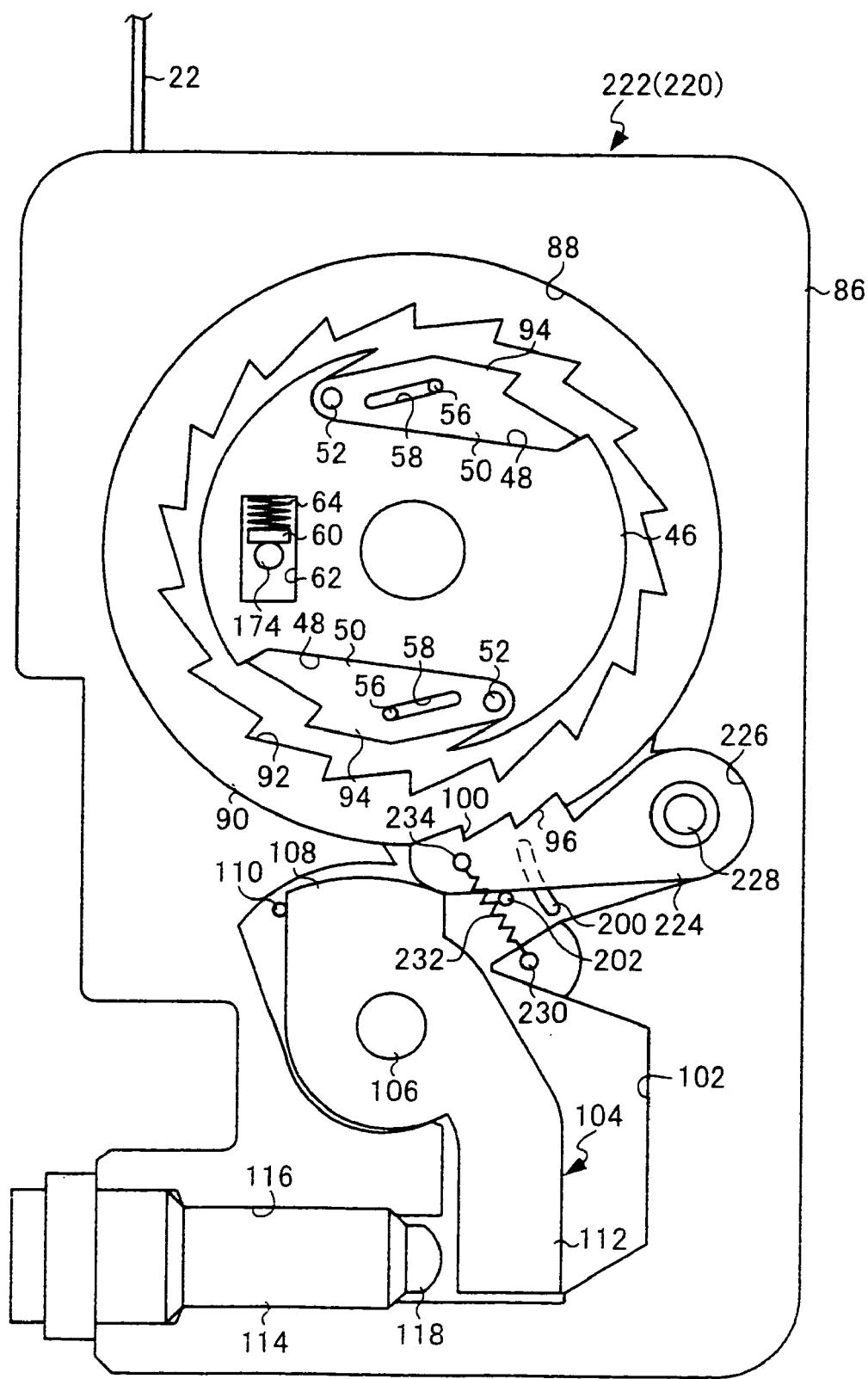
FIG. 17 is a front view showing structure of a second locking mechanism which is a principal structure of a webbing winding device relating to a fourth embodiment of the present invention.

FIG. 17 shows structure of principal components of a webbing winding device 220 relating to the present embodiment in a front view.

As shown in FIG. 17, the webbing winding device 220 is provided with a second locking mechanism 222 in place of the second locking mechanism 192 of the third embodiment. The second locking mechanism 222, rather than being provided with the ring-locking pawl 98, is instead provided with a ring-locking pawl 224, which serves as the first switching member and the second switching member.

At the generator base 86, a ring-locking pawl accommodation hole 226 is formed in place of the ring-locking pawl accommodation hole 194 to correspond with the ring-locking pawl 224. A shaft 228 is provided at the inner side of the ring-locking pawl accommodation hole 226. This shaft is formed protruding from the generator base 86 or the leg plate 18, and the shaft 228 axially supports the ring-locking pawl 224 with the ring-locking pawl 224 being rotatable about an axis which is parallel with the spool 20.

The ring-locking ratchet 100 which is capable of meshing with the external ratchet 96 is formed at the ring-locking pawl 224. From the state in which the ring-locking ratchet 100 is meshed with the external ratchet 96, when the ring-locking pawl 224 turns one way about the shaft 228, the state of meshing between the ring-locking ratchet 100 and the external ratchet 96 is released.

An anchoring pin 230 is formed at the generator base 86 between the support arm accommodation hole 102 and the ring-locking pawl accommodation hole 226. One end of a tension coil spring 232, which serves as the urging member of the switching member, is anchored at the anchoring pin 230. The other end of the tension coil spring 232 is anchored at an anchoring pin 234, which is formed at a distal end side of the ring-locking pawl 224, away from the shaft 228.

In the state in which the ring-locking ratchet 100 is meshed with the external ratchet 96, the tension coil spring 232 urges the distal end side of the ring-locking pawl 224 toward the anchoring pin 230. However, in this state, as shown in FIG. 17, the support portion 108 abuts against a side face of the distal end side of the ring-locking pawl 224 and restricts turning of the ring-locking pawl 224.

Figure 18:
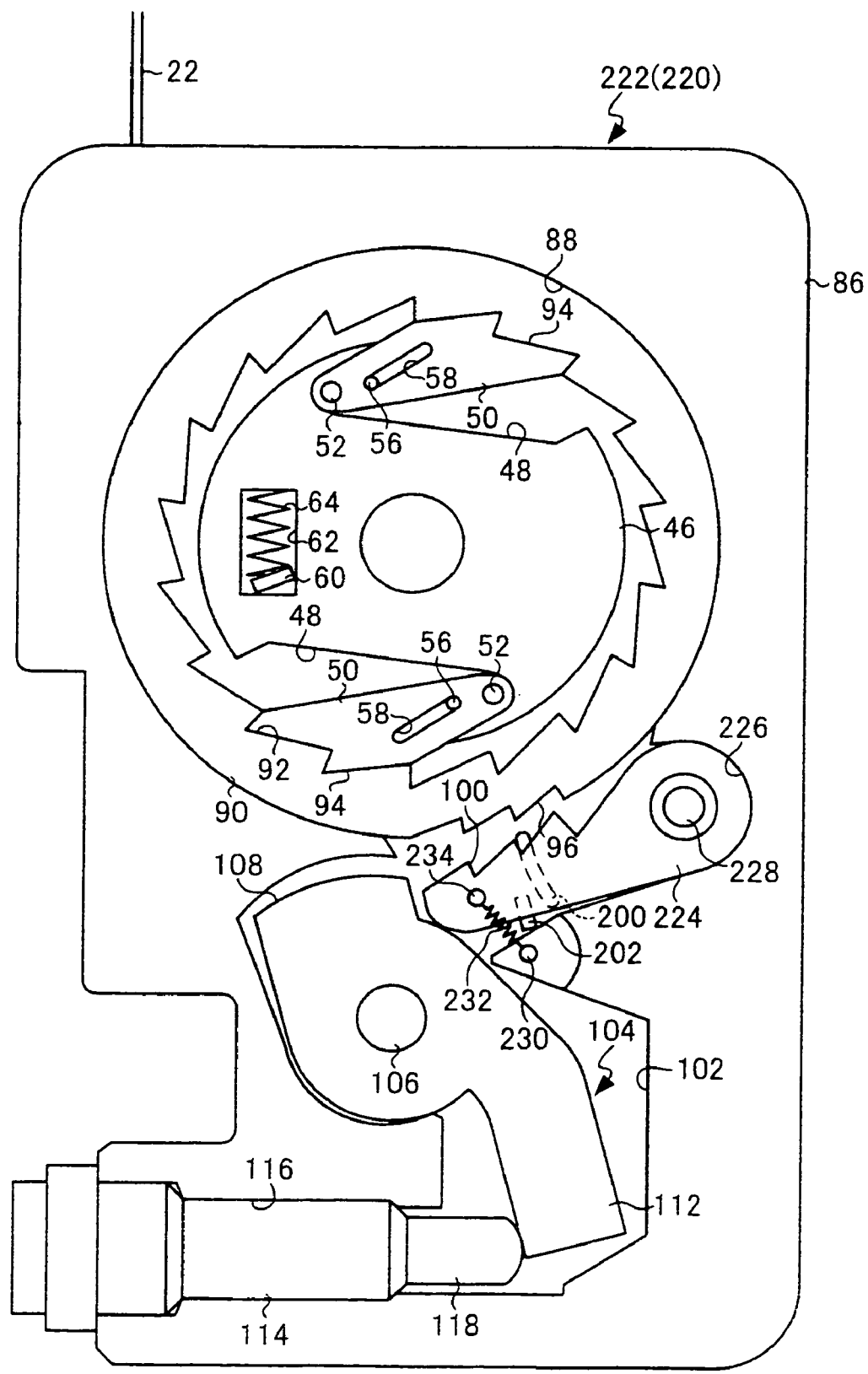
FIG. 18 is a front view showing structure of the second locking mechanism which is a principal structure of the webbing winding device relating to the fourth embodiment of the present invention.

From this state, when the gas generator 114 operates, as shown in FIG. 18, the push plunger 118 protruding from the gas generator 114 pushes the pushed portion 112 and the support arm 104 is turned about the arm support pin 106. Thus, the abutting of the support portion 108 against the side face of the distal end side of the ring-locking pawl 224 is canceled. Hence, when the abutting of the support portion 108 against the side face of the distal end side of the ring-locking pawl 224 is released, the ring-locking pawl 224 is pulled on by the tension coil spring 232, and the ring-locking pawl 224 turns about the shaft 228.

As a result, the state of meshing between the ring-locking ratchet 100 and the external ratchet 96 is canceled and, when the second locking pawl ratchets 94 of the second locking pawls 50 mesh with the internal ratchet 92 of the locking ring 90, the second lock base 46 can rotate to follow the locking ring 90.

Further, when the ring-locking pawl 224 turns such that the ring-locking ratchet 100 moves away from the external ratchet 96, a side face of the ring-locking pawl 224 impacts on an inner periphery face of the ring-locking pawl accommodation hole 226. Because of this impact, the ring-locking pawl 224 acts to turn such that the distal end of the ring-locking pawl 224 will move toward the locking ring 90.

However, in the present embodiment, the urging force of the tension coil spring 232 opposes the turning of the ring-locking pawl 224 in the direction in which the distal end side of the ring-locking pawl 224 approaches the locking ring 90. Therefore, the ring-locking pawl 224 that has turned such that the ring-locking ratchet 100 moves away from the external ratchet 96 will not turn back (move back) and cause the ring-locking ratchet 100 to inadvertently mesh with the external ratchet 96.

What is claimed is:

1. A webbing winding deice comprising:
a spool at which a length direction base end of a long belt-form webbing belt is anchored, the webbing belt being wound, from the base end, onto the spool by rotation of the spool in a winding direction;
a frame including a pair of leg plates which oppose one another in an axial direction of the spool;
a first energy-absorbing member which is provided passing through the spool along the axial direction of the spool, the first energy-absorbing member deforming when a rotation force of at least a certain magnitude is applied to a portion of the first energy-absorbing member joined to the spool;
a first locking mechanism which includes a rotor that is integrally joined to the first energy-absorbing member at one of the pair of leg plates and which, in a predetermined condition, restricts rotation of the rotor in an unwinding direction, which is opposite to the winding direction, and indirectly restricts rotation of the spool in the unwinding direction;
a second locking mechanism which is disposed at the other of the pair of leg plates and which switches from a lock-release state to a locking state for restricting rotation of the portion of the first energy-absorbing member in the unwinding direction at the other of the pair of leg plates;
a control mechanism which is provided passing through the spool along the axial direction of the spool, the control mechanism causing the second locking mechanism to switch into the locking state in accordance with relative rotation between the rotor and the spool;
a first switching member which, by moving in a direction of withdrawal from an initial position, alters a state of at least one of the first locking mechanism and the second locking mechanism, and
a restriction structure which restricts a return to the initial position of the first switching member that has withdrawn from the initial position, including a support member which supports the first switching member at the initial position from below, and a guide structure which guides the first switching member which is moved by gravity when support provided by the support mechanism is removed in a direction which is inclined relative to a vertical downward direction, and guides the first switching member to a position opposing the support member if the first switching member moves toward the initial position after withdrawing from the initial position.

2. The webbing winding deice of claim 1 wherein, in a state in which rotation of the first energy-absorbing member is restricted by the second locking mechanism, when a rotation force of at least a predetermined magnitude is applied to the spool, a deformation occurs in the first energy-absorbing member between the portion joined to the spool with the first energy-absorbing and a portion that is subject to the rotation restriction by the second locking mechanism.

3. The webbing winding deice of claim 1, further comprising a lock-release mechanism which disables the rotation restriction of the first energy-absorbing member by the second locking mechanism.

4. The webbing winding deice of claim 1, wherein the control mechanism further includes a second energy-absorbing member, one end of which is anchored at the rotor and another end of which is accommodated at an inner side of the spool, the second energy-absorbing member being deformed while being drawn out toward the rotor when the spool relatively rotates in the unwinding direction with respect to the rotor, and switching of the second locking mechanism into the locking state being enabled by the second energy-absorbing member moving toward the rotor.

5. The webbing winding deice of claim 4, wherein the other end of the second energy-absorbing member protrudes from the spool, engages with the second locking mechanism and maintains the second locking mechanism in the lock-release state, the engagement of the other end with the second locking mechanism being released by the other end being drawn into the spool, for enabling switching of the second locking mechanism into the locking state.

6. The webbing winding deice of claim 4, wherein the second energy-absorbing member comprises a wire.

7. The webbing winding deice of claim 1, wherein the restriction structure comprises a restriction member which opposes, at the initial position, the first switching member that has withdrawn from the initial position, abuts against the first switching member if the first switching member acts to move toward the initial position, and blocks a return of the first switching member to the initial position.

8. The webbing winding deice of claim 1, further comprising:
a blocking member which is provided standing at a side of the first switching member that is at the initial position, abuts against the first switching member, and blocks movement of the first switching member in the direction of withdrawal from the initial position; and
a clearance cavity which is provided sideward of a path of movement of the first switching member in the direction of withdrawal from the initial position, accommodates the blocking member when the blocking member is detached from a standing direction base end side thereof and falls, and allows the blocking member to be cleared from the movement path.

9. The webbing winding deice of claim 8, wherein an outer diametric dimension of the blocking member is set smaller than a size of the clearance cavity along the standing direction of the blocking member.

10. The webbing winding deice of claim 1, wherein the first energy-absorbing member comprises a torsion shaft.

* * * * *